(12) United States Patent
Simon et al.

(10) Patent No.: US 7,028,183 B2
(45) Date of Patent: Apr. 11, 2006

(54) ENABLING SECURE COMMUNICATION IN A CLUSTERED OR DISTRIBUTED ARCHITECTURE

(75) Inventors: Thor John Lancelot Simon, New York, NY (US); Alain Franck Gefflaut, Tarrytown, NY (US); Philippe Alain Pierre Joubert, Saint-Malo (FR); Sandeep Kishan Singhal, Englewood Cliffs, NJ (US); Richard Kent Neves, Tarrytown, NY (US)

(73) Assignee: Symantec Corporation, Cupertino, CA (US)

( * ) Notice: Subject to any disclaimer, the term of this patent is extended or adjusted under 35 U.S.C. 154(b) by 917 days.

(21) Appl. No.: 10/011,538

(22) Filed: Nov. 13, 2001

(65) Prior Publication Data

US 2003/0093691 A1 May 15, 2003

(51) Int. Cl.
*G06F 1/26* (2006.01)
(52) U.S. Cl. ............... 713/168; 713/161; 713/171; 713/182; 713/200; 713/201
(58) Field of Classification Search ........ 713/161–168, 713/171, 182, 200, 201
See application file for complete search history.

(56) References Cited

U.S. PATENT DOCUMENTS

| | | | |
|---|---|---|---|
| 4,054,756 A * | 10/1977 | Comella et al. | 379/88.26 |
| 6,418,130 B1 | 7/2002 | Cheng et al. | |
| 6,438,612 B1 | 8/2002 | Ylonen et al. | |
| 6,456,594 B1 * | 9/2002 | Kaplan et al. | 370/238 |
| 2001/0009025 A1 | 7/2001 | Ahonen | |
| 2001/0055394 A1 | 12/2001 | Vanttinen et al. | |
| 2002/0026527 A1 | 2/2002 | Das et al. | |
| 2002/0056001 A1 | 5/2002 | Magee et al. | |
| 2002/0069278 A1 | 6/2002 | Forslöw | |
| 2003/0033518 A1 | 2/2003 | Faccin et al. | |

OTHER PUBLICATIONS

Singhal, Sandeep K., "From Wireless LANs to Wireless Network Systems: Applying Lessons from Cellular Networking to Enterprise Wireless Networking", submitted in Oct., 2001 for publication in "Wireless Local Area Networks: The New Wireless Revolution", Benny Bing (ed.), to be published by John Wiley & Sons; ISBN: 047122474X, New York, NY, on May 24, 2002.

* cited by examiner

*Primary Examiner*—Thomas R. Peeso
(74) *Attorney, Agent, or Firm*—Fenwick & West LLP

(57) ABSTRACT

Techniques for enhancing security in networking environments, whereby a cryptographic node negotiates a set of security parameters (a "security association") with an end node, on behalf of a routing node (an "edge router"), and then securely distributes the negotiated security parameters to the edge router and/or to other edge routers in the network. The disclosed negotiation techniques allow the end node to physically move during the negotiation, yet still establish the security association, and the secure distribution enables the end node to move seamlessly through the network yet continue communicating securely. The disclosed techniques may also be used advantageously in other environments, such as clustered server environments, and allow an end node to communicate with multiple routing or server nodes for a variety of reasons (for example, during a hot-swap to a different server during fail-over or as a result of load balancing).

68 Claims, 12 Drawing Sheets

US 7,028,183 B2

ENABLING SECURE COMMUNICATION IN A CLUSTERED OR DISTRIBUTED ARCHITECTURE

CROSS REFERENCE TO RELATED INVENTIONS

The present invention is related to U.S. Pat. No. 6,633,761 (Ser. No. 09/637,742, filed 10 Aug. 2000), which is entitled "Enabling Seamless User Mobility in a Short-Range Wireless Networking Environment", and (Ser. No. 09/848,441, filed 3 May 2001), which is entitled "Method and System for Adapting Short-Range Wireless Access Points for Participation in a Coordinated Networked Environment". These patents are referred to hereinafter as the "first related invention" and the "second related invention", respectively, and are hereby incorporated herein by reference.

FIELD OF THE INVENTION

The present invention relates to distributed computing, and more particularly to enabling secure communication in distributed computing environments.

BACKGROUND OF THE INVENTION

Modern wired and wireless data networks are increasingly susceptible to interception and forgery of communications. These data security issues are particularly pronounced in short-range wireless network environments—such as those defined by the IEEE 802.11b, Bluetooth, and HiperLAN2 standards—because it is possible for nearby intruders to intercept radio transmissions. With wireless networks providing a transmission range of tens or even hundreds of meters, the ease of data intrusion is quite pronounced. Given the insecurity of radio transmissions, encryption is required for data sent and received within a wireless environment.

A wireless LAN environment comprises a plurality of wireless access points, each of which bridges traffic between a radio interface and a wired LAN interface. A large wireless network installation may include many such access points. Each access point is typically connected to an edge router that separates the wireless and wireline networks (see, for example, an access point "adapter" as described in the second related invention); alternatively, the edge router may be co-located with the access point, forming a "Handoff Management Point" as described in the first related invention. (References hereinafter to edge routers apply equally to either case.) For the wireless network, the edge routers provide various services, which may include network address assignment, support for mobility across access points and subnets, authentication and access control, device location tracking, and so on. Within this environment, users may move between different access points, either because they are mobile or because of ambient changes to the radio transmission patterns within the network environment. To deliver consistent connectivity across all access points, the various edge routers may share a single Internet Protocol ("IP") address which is exposed on their wireless interfaces (that is, to nodes communicating with the edge router from or through the wireless access points). (For example, one or more "connectivity groups" might be defined, each comprising one or more edge routers, where all the edge routers in a particular connectivity group share an IP address on their wireless interfaces.) In addition, each edge router has a unique "external" IP address that is exposed on its wireline interface (that is, to nodes communicating with the edge router from the external network); these "external" IP addresses are used to direct traffic to a particular edge router.

Several prior art technologies exist for addressing issues of data security in wireless environments, but many of these are known to be insecure. In wireless LAN environments, the Wired Equivalent Privacy ("WEP") protocol provides for device authentication and data encryption. However, a number of papers have been written which document serious flaws in the encryption technology of this protocol.[1] The Bluetooth encryption standard also has documented flaws.[2]

[1]See the following papers for a sampling of this documentation:

J. R. Walker. "Unsafe At Any Key Size: An Analysis of the WEP Encapsulation" Intel Corporation (document IEEE 802.11-00/362), 20 Oct. 2000.

W. A. Arbaugh. "An Inductive Chosen Plaintext Attack Against WEP/WEP2." IEEE 802.11 TGi Working Group, Orlando, Fla., May 2001. (A complete analysis is described in W. A. Arbaugh, N. Shankar, Y. C. Wan, "Your 802.11b Network has no Clothes," March 2001.)

N. Borisov, I Goldberg, and D. Wagner. "Intercepting Mobile Communications: The Insecurity of 802.11." Proceedings of the ACM SIGMOBILE Seventh Annual International Conference on Mobile Computing and Networking, July 2001.

N. Borisov, I Goldberg, and D. Wagner. "Intercepting Mobile Communications: The Insecurity of 802.11." Proceedings of the ACM SIGMOBILE Seventh Annual International Conference on Mobile Computing and Networking, July 2001.

S. Fluhrer, I. Mantin, and A. Shamir. "Weaknesses in the Key Scheduling Algorithm of RC4." Proceedings of the Eighth Annual Workshop on Selected Areas in Cryptography, August 2001.

A. Stubblefield, J. Ioannidis, and A. Rubin. "Using the Fluhrer, Mantin, and Shamir Attack to Break WEP." AT&T Labs Technical Report TD-4ZCPZZ, Revision 2, 21 Aug. 2001.

[2]See the following paper:

IT Week. "Tests Uncover Bluetooth Flaw." ZDNet, 8 Sep. 2000.

Other prior art systems such as Virtual Private Networks (VPNs) can provide good data security. However, this technology is designed such that it enables a secure point-to-point link between a client and a server. To deploy a VPN, each client must establish a VPN session with a VPN server (also known as a VPN gateway). To ensure the security of transmitted data traffic, a VPN is typically configured so that all network traffic from the client must be encrypted and pass through that VPN server, regardless of its ultimate destination; all traffic to that client similarly must pass through that VPN server and be encrypted, regardless of its origin. This VPN configuration has a number of drawbacks. First, the VPN server represents a bottleneck because it must process all traffic traveling to or from the client. Second, it introduces considerable network bandwidth and network switching overhead because all packets must be routed through the VPN server (instead of being routed directly between the client and its peer host). Third, it introduces considerable configuration and management overhead because each client must be appropriately configured with the correct VPN server identity, and changes to the VPN servers require corresponding changes to the various client configurations. It is possible for a client to communicate with multiple VPN servers simultaneously, with each server configured to handle traffic associated with a particular set of peer hosts. However, a multi-server system requires even more configuration and does not eliminate the fundamental bottlenecks, routing, bandwidth, and management complexities that are inherent to a VPN design. Consequently, it is not feasible to deploy VPNs in a modern clustered or distributed server architecture, even though this deployment is desirable for reasons of flexibility, redundancy, and/or scalability.

The result is that in environments such as wireless local area networks (for example, IEEE 802.11b networks or Bluetooth networks) and Virtual Private Networks, a choice must be made between good security on the one hand and good scalability or reliability on the other—because as just discussed, the VPN architecture which is preferred for security in these environments is very difficult to deploy in a clustered or distributed manner.

The most common VPN implementation uses a security protocol known as Internet Protocol Security ("IPsec"). IPsec is defined in Internet Engineering Task Force ("IETF") Request for Comments ("RFC") 2401, "Security Architecture for the Internet Protocol" (November 1998), referred to hereinafter as "the IPsec specification". IPsec provides security services at the IP layer by enabling a system to select required security protocols, determine the algorithm(s) to use for the service(s), and put in place any cryptographic keys required to provide the requested services. IPsec can be used to protect one or more "paths" between a pair of hosts and/or routers. Within a VPN architecture, IPsec provides the data security required to protect traffic between the VPN client and the VPN server.

IPsec has two principal modes, "tunnel mode" and "transport mode." Tunnel mode is generally used between end nodes and routers, or between pairs of routers; it protects data communications across one or more network links that are not believed to be secure, but the same communications may traverse other portions of the network unprotected. Transport mode is generally used between end nodes; it protects traffic across the entirety of the network between the two nodes. Most VPN implementations employ IPsec in tunnel mode.

The protocols used for encrypting and authenticating data in the IPsec architecture are "Encapsulating Security Payload" ("ESP") and "Authentication Header" ("AH"), respectively. (For more information on these protocols, refer to IETF RFC 2406, "IP Encapsulating Security Payload", November 1998, and IETF RFC 2402, "IP Authentication Header", November 1998.) These protocols require selection of a cipher and key negotiation, as well as negotiation of various other parameters, before they can be used for communication. This choice of cipher, keys, and other information for a particular instance of the AH or ESP protocol between two nodes forms what is known as a Security Association ("SA"). The IPsec protocol uses a key-exchange protocol known as Internet Key Exchange ("IKE") to negotiate the Security Associations for the ESP and AH protocols. The first attempt to transmit data from one node to another using ESP or AH triggers an IKE negotiation, which leads to both nodes agreeing on an SA. Each SA pertains to communications between the two nodes, as identified by their IP addresses; on each node, a particular SA is distinguished from the SA(s) for other communications by the IP addresses representing the two endpoints of the IPsec session and by a locally assigned SA number.

It should be noted that an SA may include not only the initial information negotiated by the key-exchange protocol but also cryptographic information relevant to previous messages protected by ESP or AH (such as block-chaining or feedback information for a cipher or message authentication code) which is required to correctly process new ESP or AH messages. This additional cryptographic information may change as the IPsec tunnel is used, in accordance with the procedures of the negotiated cipher.

In wireless environments in which the radio link is deemed to be insecure, it is particularly desirable to use IPsec in tunnel mode to protect traffic between wireless end nodes and the edge routers separating the wireless from the wired portion of a given network. As described above, a large wireless network includes multiple wireless access points and edge routers; to achieve transparency, several edge routers may share the same IP address on their wireless interfaces. Because IPsec is designed to support point-to-point encryption sessions, however, it is not well suited to a distributed or clustered architecture that can deliver reliability and scalability, as will now be described.

A particular difficulty for a distributed or clustered IPsec implementation is distribution of cipher keys. Two serious problems arise. First, for IKE negotiation to succeed, all of the IKE packets for establishing the SA must arrive at the same physical node (e.g. edge router); otherwise no SA will be negotiated and no encrypted traffic can ever be exchanged. This presents a problem with mobile devices, which may be passed from one edge router to another during the time that an IKE negotiation process is underway. Second, once IKE negotiation has produced one or more SAs, those SAs must be made available to every node (e.g. edge router) that can transmit or receive traffic using the associated IP address. That is, the SAs (and their associated cipher keys, ESP parameters, and AH parameters) need to be available at any edge router to which a mobile wireless end node's traffic is directed, in order for the collection of edge routers to provide seamless yet secure connectivity for the mobile end node. Otherwise, packets may arrive at nodes at which they cannot be decrypted/encrypted or authenticated, resulting in severe problems including significant packet loss and communication breakdown, and in turn, an increase in network latency and a decrease in network throughput.

Accordingly, a need exists for enhanced security in wired and wireless networks while maintaining scalability, reliability, and performance.

SUMMARY OF THE INVENTION

It is an object of the present invention to enhance the security of wired and/or wireless networks while maintaining scalability, reliability, and performance. Consequently, it is an object of the present invention to enable scalable and reliable implementation of the IPsec protocol, particularly in distributed or clustered environments, because such environments are believed to be particularly advantageous for scalable, reliable operation of networks.

The present invention provides techniques for enabling IPsec in a clustered or distributed architecture. A distributed or clustered system as described herein comprises a plurality of edge routers that perform IPsec ESP and/or AH processing for a multiplicity of end nodes, and also one or more cryptographic nodes which are disclosed herein for performing key exchange. Optionally, a single physical node may act as both edge router and cryptographic node. In preferred embodiments, the ESP and AH protocols are performed in tunnel mode, so that the edge routers decrypt traffic sent to them by the end nodes before retransmitting it elsewhere on the (secure) network and so that the edge routers encrypt traffic sent to them from elsewhere in the network before retransmitting it to the end nodes.

In contrast to prior art systems, the key exchange procedure which is defined by the present invention to establish Security Associations for the ESP and AH protocols for a given end node is not required to be performed by the physical node or nodes which will actually use those SAs to encrypt, decrypt, or authenticate traffic. Instead, procedures are defined herein whereby a cryptographic node(s) performs key exchange with end nodes on behalf of an edge router; these procedures are also referred to herein as "SA negotiation". Moreover, procedures are defined whereby the SA(s) negotiated by that cryptographic node(s) is installed in a plurality of edge routers and/or encryption nodes; this installation procedure is also referred to herein as "SA distribution". Furthermore, when encryption nodes are in place, procedures are defined herein for filtering network traffic at the edge router, to ensure use of data encryption in accordance with administrative or security policies; these procedures are referred to herein as "IPsec filtering". As a result of using the novel techniques of the present invention, ESP and AH can be used to protect communications in a distributed or clustered environment without change to the existing standardized ESP and AH protocol design and, in particular, without any modifications to the ESP and AH protocol implementation on the client device.

DETAILED DESCRIPTION OF THE INVENTION

The present invention provides novel techniques which enable enhanced security in networking environments. SA negotiation and distribution techniques are disclosed, as are techniques for propagating SAs between edge routers. These novel techniques will now be described.

Various methods of forwarding or directing the key-exchange (e.g. IKE) packets for any given end node to a cryptographic node may be implemented; similarly, various methods of SA distribution may be used between the cryptographic node(s) and edge routers. Such variations are within the scope of the present invention, and a number of these variations are described herein.

Certain embodiments of the present invention relocate the SA negotiation procedure (i.e. the IKE negotiation) such that, in contrast to the prior art, the negotiation no longer occurs between an end node and an edge router. Instead, as stated above, a cryptographic node negotiates the SA with the end node on behalf of the plurality of edge routers. In this manner, the IKE protocol flow is not impacted by a mobile device moving from one edge router to another; the client directs the IKE protocol traffic to a particular IP address (in certain embodiments, the IP address shared by the edge routers; or, in certain other embodiments, the IP address of the encryption nodes) and each edge router (or encryption node) forwards any received IKE packets to the cryptographic node.

As will be evident to those skilled in the art, the SA negotiation procedures described herein may be practiced with alternate key negotiation protocols, such as Kerberized Internet Negotiation of Keys ("KINK"), conforming generally to the IPsec architecture. The SA negotiation procedures are described as they relate to IKE and KINK; for use with other key negotiation protocols, these procedures may be practiced by replacing IKE or KINK messages with messages of the appropriate protocol. (A preliminary version of the KINK protocol was presented at the August, 2001 meeting of the Internet Engineering Task Force. More information on this protocol may be found in an IETF Internet Draft titled "Kerberized Internet Negotiation of Keys (KINK)", M. Thomas et al., Jul. 19, 2001. This Internet Draft is available on the Internet at http://www.ietf.org/internet-drafts/draft-ietf-kink-kink-01.txt.)

Figure 1:
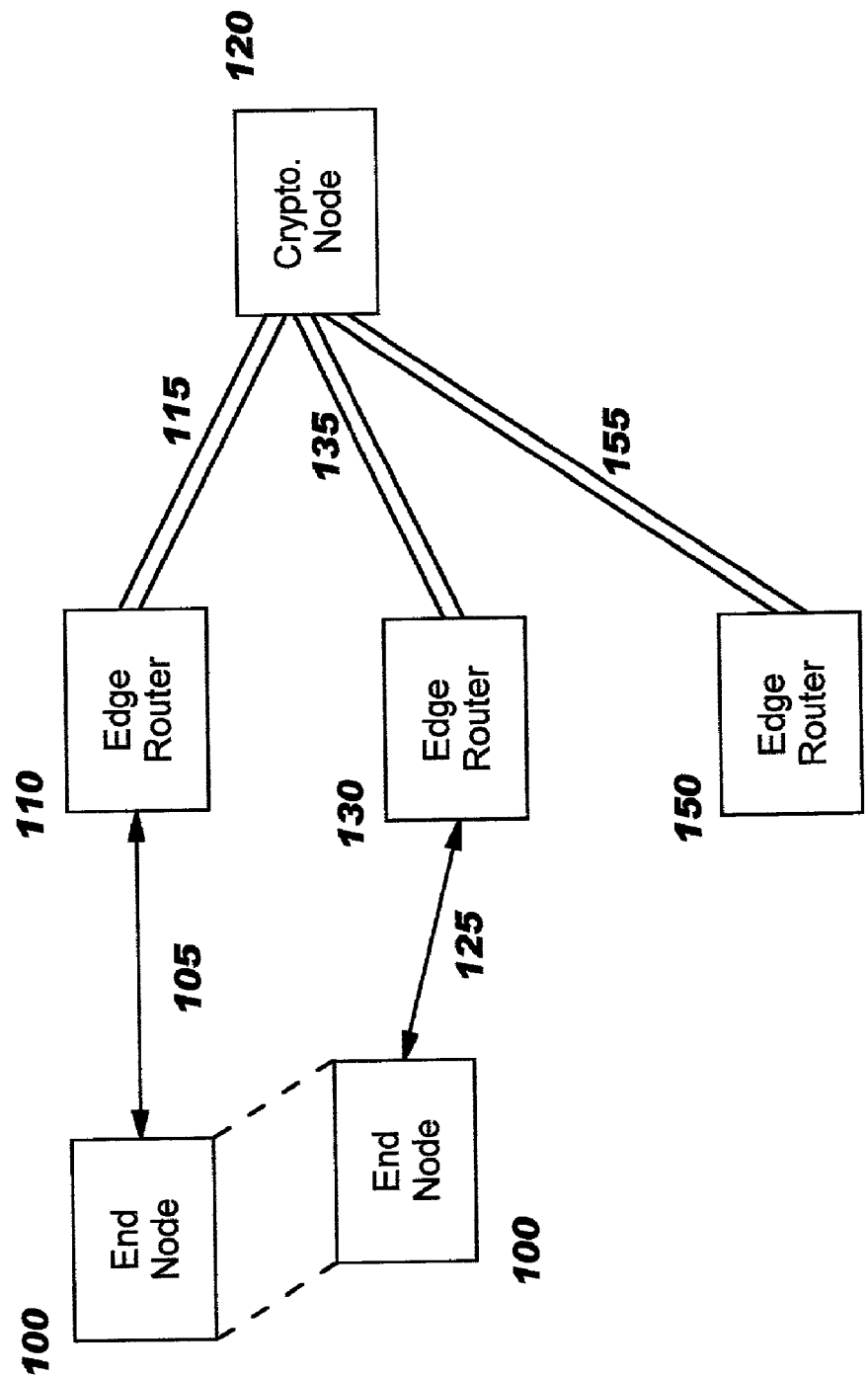
FIG. 1 illustrates an embodiment of the present invention which uses tunneling between the edge routers and the cryptographic nodes.

In one embodiment of the SA negotiation procedure, a transport-layer encryption facility such as Secure Sockets Layer ("SSL"), Transport Layer Security ("TLS"), or Secure Shell ("SSH" or "SECSH") or a network-layer encryption facility such as IPsec, or a link-layer encryption facility such as Point-to-Point Tunneling Protocol ("PPTP"), Layer 2 Tunneling Protocol ("L2TP"), or Layer 2 Forwarding Protocol ("L2F") may be used to create secure tunnels between the edge routers and the cryptographic node(s); in other implementations (which are less desirable), other non-secure tunneling protocols (such as IP-in-IP encapsulation) may be used. This embodiment is illustrated in FIG. 1. (See, for example, secure transport/network/link-layer tunnels 115, 135, and 155.) When an end node 100 transmits 105 IKE packets addressed to the edge router 110 to negotiate an SA, the edge router 110 will forward those packets through the secure tunnel 115 to a cryptographic node 120. (Typically, if more than one cryptographic node is available, the particular cryptographic node to which this traffic is sent is pre-configured. Alternatively, the edge router could select an arbitrary cryptographic node, or it could apply some load-balancing operation to select a cryptographic node, e.g. based on a hash of the client's IP address.) Similarly, response packets generated by the cryptographic node 120 will be forwarded by it to the appropriate edge router (for example, edge router 110) over secure tunnel 115 for retransmission 105 to the end node 100, enabling the end node 100 and cryptographic node 120 to establish one or more SAs. If end node 100 happens to move from edge router 110 to another edge router such as edge router 130 during the SA negotiation process, the cryptographic node will detect this situation because the end node's traffic will arrive through a different secure tunnel (from a different edge router) and traffic directed to that end node will consequently be sent to that edge router through the corresponding secure tunnel. In this situation, the IKE messages being exchanged between end node 100 and cryptographic node 120 are now forwarded over secure tunnel 135.

Once the SA negotiation between end node 100 and cryptographic node 120 completes, the established SA uses the IP addresses of the end node 100 and the edge router 110 (which is also the IP address of edge router 130), on whose behalf the cryptographic node 120 negotiated the SA. The SA distribution procedure then takes place, whereby one or more SAs negotiated by the cryptographic node 120 (that is, secure information which the SA represents) are forwarded to the edge router 110 and/or to edge router 130 and/or to another edge router 150, as will be described below. As a result of this SA distribution, end node 100 can securely communicate with edge routers 110, 130, and 150 using the distributed SAs with the ESP or AH protocols (as if the edge router itself had established the SAs), and can seamlessly move between edge routers 110, 130, and 150.

Figure 2:
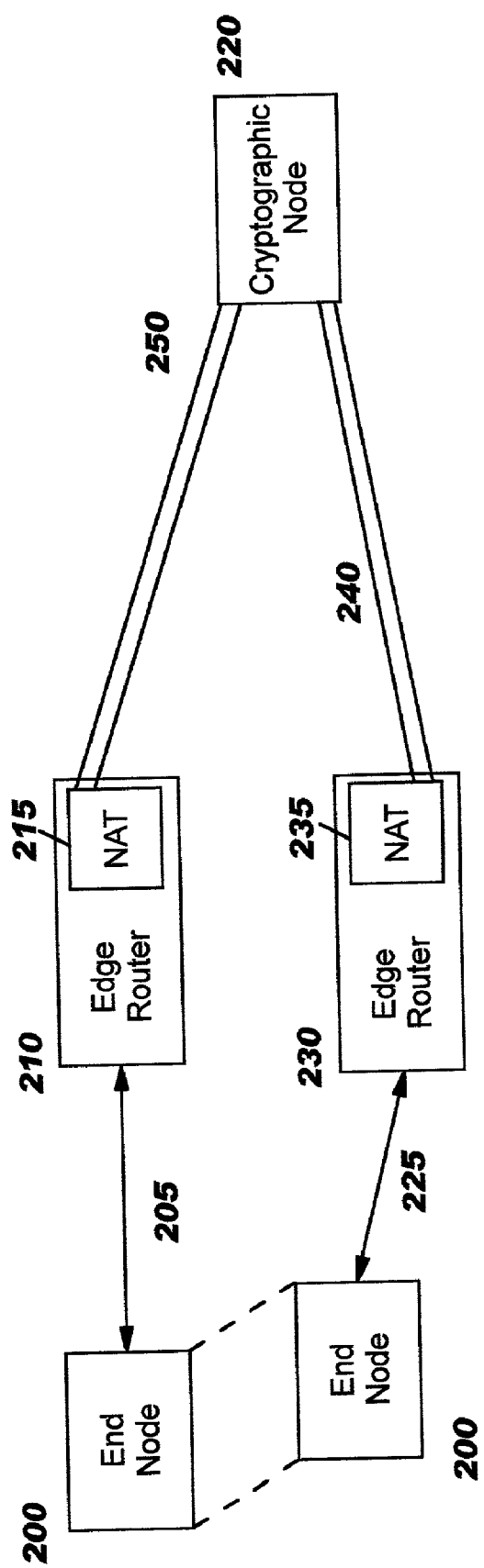
FIG. 2 illustrates an embodiment using Network Address Translation between the edge routers and the cryptographic nodes.

In another embodiment of the SA negotiation procedure, the edge routers enable SA negotiation through the use of Network Address Translation (NAT), as illustrated in FIG. 2. When an edge router 210, 230 receives an IKE packet 205 from an end node, it applies Network Address Translation ("NAT") 215, 235 to the packet, replacing its destination IP address from that of edge router 210, 230 with that of cryptographic node 220; the modified packet is then re-transmitted by the edge router and forwarded through the network to cryptographic node 220. IKE messages from the cryptographic node are destined for the end node and get routed to the edge router. Upon receiving IKE messages from a cryptographic node 220, edge routers 210, 230 apply NAT 215, 235 to rewrite the source address in the IKE packet to be the shared address used by the edge router 210, 230 (that is, the address to which the IKE traffic from the end node was originally sent) and re-transmit the IKE packet for delivery to the end node 200. (In an alternative implementation of this embodiment, the edge router may also modify IKE traffic being forwarded to the cryptographic node so that the source address matches that of the edge router's external address, and it may optionally change the source port number; IKE traffic from the cryptographic node is then destined to the edge router's external address (and modified port number), and the edge router rewrites the destination address (and port number) to be that of the end node.) When the IKE exchange has completed between the end node 200 and cryptographic node 220, establishing one or more new SAs, the cryptographic node 220 performs an SA distribution procedure to direct the resulting SAs to edge routers 210 and/or 230, as will be described below.

In still another embodiment of the SA negotiation procedure, a "connectivity protocol" is used to maintain packet-based communications between various network nodes and particularly between the edge routers and the cryptographic node(s). Such a connectivity protocol optionally may include within it a routing protocol, or may itself be a routing protocol (for example, Open Shortest Path First ("OSPF") or Routing Information Protocol ("RIP")). Moreover, such a connectivity protocol optionally may provide encryption by means of IPsec, TLS, or another method. In this embodiment, an IKE message received at an edge router from an end node is encapsulated in a special message of the connectivity protocol and transmitted to a cryptographic node, and a corresponding IKE response from said cryptographic node is encapsulated by the cryptographic node in a special message of the connectivity protocol and transmitted to the appropriate edge router, where it is removed from the special message and forwarded to the end node. In an example of this embodiment, the HMP Presence Protocol described in the first related invention constitutes a connectivity protocol whereby the access points maintain communications with a management server; in addition to the standard registration request and registration response messages defined by the HMP Presence Protocol, an embodiment of the present invention defines an additional message (such as "IKE negotiation") or additional messages (such as "IKE negotiation request" and "IKE negotiation response") to encapsulate the IKE packets being forwarded between the edge routers and the cryptographic node. In an alternative implementation which extends the RIP protocol, a new command code (e.g., 3) is defined to represent an encapsulated IKE negotiation; modified implementations of the RIP protocol at the edge router and cryptographic node are capable of interpreting this special command code and processing its contents. When the IKE exchange has completed between the end node and cryptographic node, establishing one or more new SAs, the cryptographic node performs an SA distribution procedure to direct the resulting SAs to a plurality of edge routers, as will be described below.

In any of these above-described embodiments, ESP and AH function normally on the end node and edge router; only the key-exchange protocol is modified (at the edge router and cryptographic node), and this modification is invisible to the end node. The result is that key exchange is negotiated between the end node and a cryptographic node, but the resulting SAs are used between the end node and the edge routers (ant not by the cryptographic node).

After the SA negotiation procedure is complete, the cryptographic node performs an SA distribution procedure as will be described in more detail below. The SA distribution procedure distributes the negotiated SAs from the cryptographic node to a plurality of edge routers (and/or encryption nodes) that, in turn, use the SAs to support IPsec encryption with the end nodes. The SA distribution procedure must take place over a secure channel, because the SAs include sensitive key information.

In one embodiment of the SA distribution procedure, the SAs are distributed to the edge routers over secure sessions established between the edge routers and the cryptographic node(s) and/or between the edge routers themselves. Examples of these sessions include transport-layer sessions such as SSL, TLS, or SSH (SECSH) or network-layer sessions such as IPsec or link-layer sessions such as PPTP, L2TP, or L2F. In the case that the cryptographic node is participating in the SA distribution procedure, these sessions may be the same sessions used to transport IKE negotiation in the first embodiment of the SA negotiation procedure.

In another embodiment of the SA distribution procedure, the SAs are distributed to the edge routers by encapsulating them within messages of a "connectivity protocol" used to maintain packet-based communications between various network nodes and particularly among the edge routers and the cryptographic node(s). This connectivity protocol may be the same as that used to implement the third embodiment of the SA negotiation procedure, described previously. In this embodiment, SAs are encapsulated in a special message of the connectivity protocol and transmitted by an edge router or by the cryptographic node to the destination edge router(s).

In either of the above embodiments of the SA distribution procedure, partial SA information may be distributed. This may be appropriate when it is known that the recipient already possesses portions of the SA. For example, when an SA is updated with new cryptographic information, it may not be necessary to re-distribute information about the negotiated cipher.

In any of the above embodiments of the SA negotiation or SA distribution procedures, a cryptographic node may use IKE in two modes: one to negotiate SAs for use by itself when communicating with the edge routers (for example, for receiving IKE traffic originating at the end node and forwarded by the edge router, for forwarding to the edge router IKE traffic destined for the end node, or for distributing the negotiated SAs to edge routers), and another to negotiate SAs for use between the edge routers and end nodes. An edge router preferably uses IKE in only one mode, which negotiates SAs for use between that edge router and cryptographic nodes (for forwarding IKE packets originating from or destined to end nodes as part of the SA negotiation procedure, or for receiving SAs as part of the SA distribution procedure) or other edge routers (for sending and receiving SAs as part of the SA distribution procedure). The edge router also proxies (whether by tunnel encapsulation as discussed in the first embodiment above, using NAT as discussed above in the second embodiment, by connectivity protocol encapsulation as discussed above in the third embodiment, or by some other mechanism) IKE requests to a cryptographic node; the cryptographic node will return to the edge router the SAs which are created, and the edge router then uses these SAs to communicate with end nodes. (In preferred embodiments, the SA negotiation procedures disclosed herein are a complete replacement for prior art SA negotiation between end nodes and edge routers, unless cryptographic node functionality is co-located with the edge router.)

Whereas the embodiments which have been described are directed toward relocating the IKE negotiation procedure, in yet another embodiment, the IPsec (AH or ESP protocol) processing is moved. This IPsec processing may be located in a node referred to herein as an encryption node or in any one of a plurality of encryption nodes, where the encryption node(s) may be physically separate from the edge routers. Packet filters within the edge routers control which traffic from the end nodes must pass to these encryption nodes and which traffic may pass directly (and therefore without encryption through the IPsec tunnel) to the destination hosts. In some configurations, these packet filters therefore can reduce the amount of traffic that must pass through the encryption nodes, thereby reducing the overall cryptographic load. This is in contrast to the prior art, in which the end node either transmits all data through the IPsec tunnel or in which the end node is solely responsible for selecting which traffic passes through the IPsec tunnel encryption. In particular, the packet filters within the edge routers enable the network to enforce cryptographic policies without relying on the proper configuration of the end nodes. In this embodiment, the encryption nodes may be co-located with cryptographic node processing thus providing the functionality of a conventional IPsec endpoint.

Figure 3:
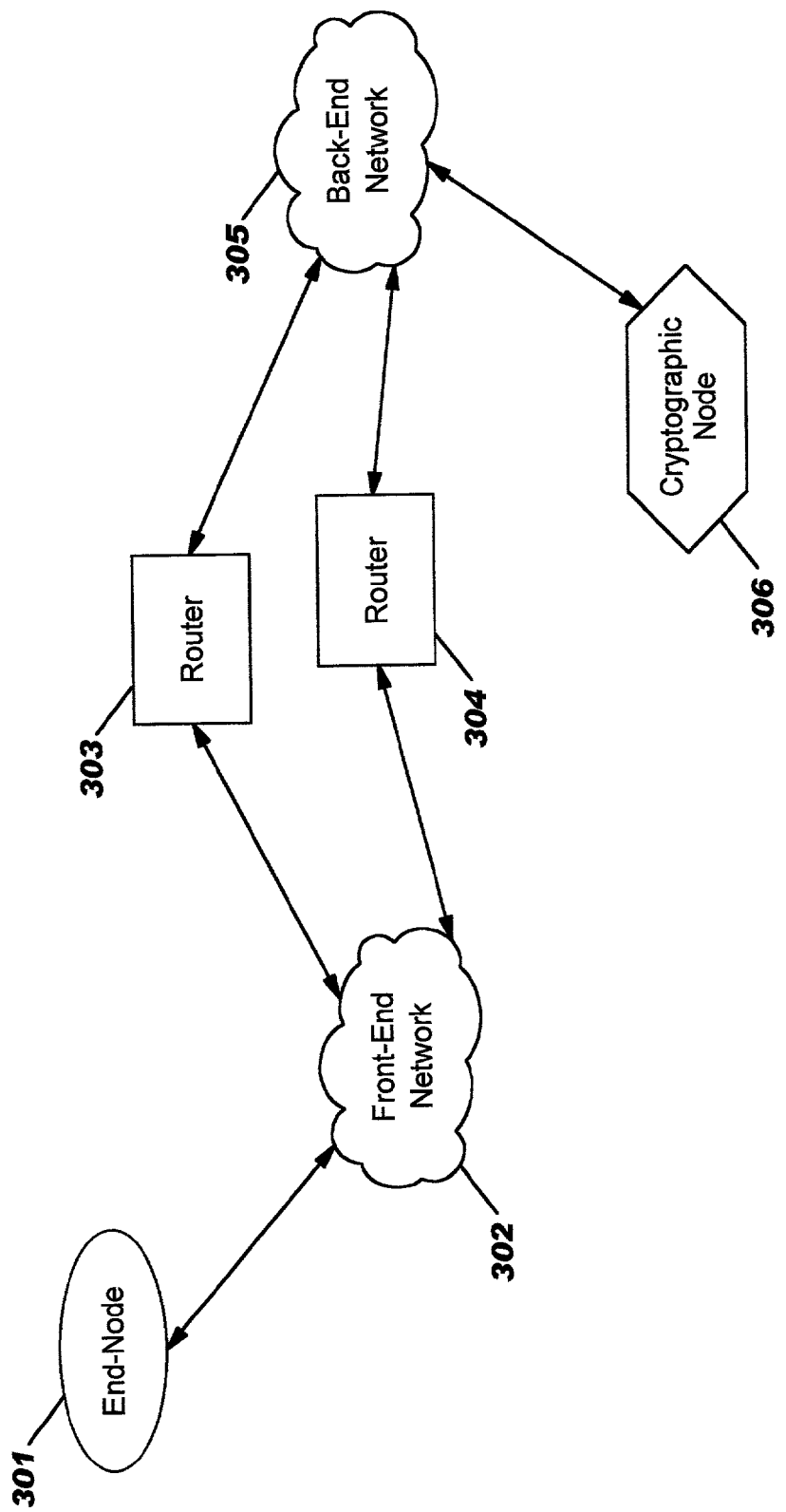
FIG. 3 is a diagram of an embodiment of the invention including one end node and two edge routers.

Referring now to FIG. 3 of the drawings, an embodiment of the invention is illustrated comprising one or more edge routers 303, 304 that communicate with one or more end nodes 301 across a front-end network 302 (which might comprise a wireless network or a wireline network, with associated access points, network ports, routers, switches, and other infrastructure) and with a cryptographic node 306 across a back-end network 305 (which might comprise a wireless network or a wireline network, with associated access points, network ports, repeaters, switches, routers, and other infrastructure). An arbitrarily chosen edge router 303 may also communicate with any other arbitrarily chosen edge router 304 across the back-end network 305. Further, referring briefly to FIG. 5 of the drawings, traffic from an end node 501 may traverse the front-end network 502 and then the back-end network 504 to reach other nodes connected to the back-end network 504 such as a gateway 506 which forwards packets to exterior networks 507; the reverse is also true (i.e. that packets from arbitrary other nodes such as gateway node 506 may traverse the back-end network 504 and then the front-end network 502 to reach an end node 501).

A previously-discussed one of the embodiments of the invention will now be described in more detail with reference to the components illustrated in FIG. 3, the message flows illustrated in FIG. 4, and the logic depicted in FIGS. 6, 7, and 8. We describe an embodiment of the invention as comprising a number of operations, some of which are optional. Note that the processing shown in FIG. 6 and the processing in FIG. 8 may occur at the same edge router; alternatively, if the end node is moving between edge routers, then this processing may occur at distinct edge routers.

In preferred embodiments, the SA negotiation procedure begins (Block 600) with the receipt of a key-exchange message 404 (such as an IKE request) at an edge router 303. As the invention may be practiced with any number of edge routers, this edge router may be any of the edge routers 303, 304 in the network; in contrast to certain prior art systems, no particular edge router must receive the initial key-exchange message 404. That is, the end node 301 does not need to be statically configured to send its IKE request to a particular one of the edge routers, as was required in the prior art, and the end node also does not need to be re-configured in response to changes affecting the edge routers or in response to end node movement that might affect which edge router receives the IKE request, thereby reducing administrative complexity.

In response to receiving the initial IKE message in Block 600, the edge router 303 in decision Block 605 determines whether it has an established communication channel with the cryptographic node that can process the IKE negotiation. Determination of whether this communication channel exists involves knowing the identity (that is, the address) of the cryptographic node and, optionally, establishment of a transport-layer tunnel or a network-layer tunnel or a link-layer tunnel to that cryptographic node or establishment of communications by means of a connectivity protocol. If in decision Block 605, it is determined that a communication channel has not been established, then in Block 610, a communication channel is established. Control then passes to Block 615.

In Block 615 the edge router 303 prepares this key-exchange message 404 for forwarding (for example, by embedding it in an SSL or TLS or IPsec data stream, as in the case of the transport-layer or network-layer tunnel or link-layer tunnel embodiment described above; or by re-writing its destination address and, optionally, its source address (and port), as in the case of the NAT embodiment described above; or encapsulating it in a message of a connectivity protocol such as RIP, as also described above), producing a modified message which is referred to herein as an "encapsulated key-exchange message" 405.

The encapsulated key-exchange message 405 is then transmitted (Block 620) by the edge router 303 to a cryptographic node 306. It is noteworthy that after it is transmitted to a cryptographic node, the original key-exchange message 404 need not be retained by the edge router 303 because the edge router plays no further role in the processing of that key-exchange message; this "stateless forwarding" of key-exchange messages is believed to be particularly advantageous because it reduces memory requirements on the edge router and simplifies the error handling process in case of network failure or movement of the end client to a new edge router.

Figure 7:
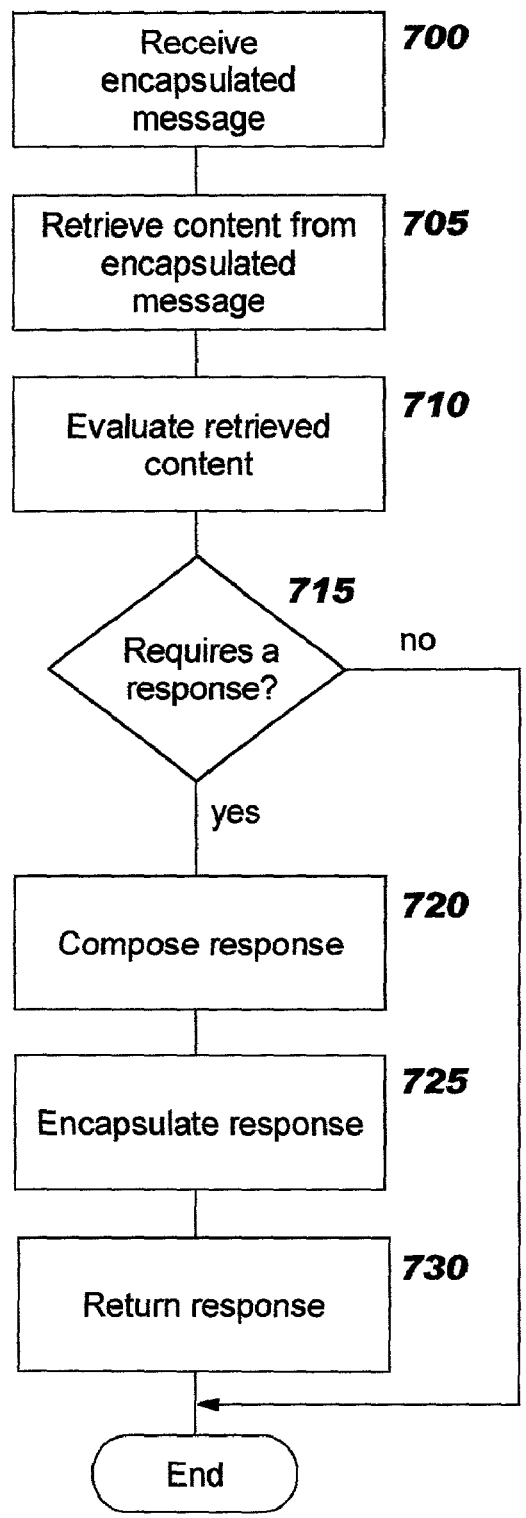

Turning now to FIG. 7, logic which may be used to carry out the cryptographic node's processing of the IKE message forwarded by the edge router is illustrated. The cryptographic node 306 receives the encapsulated key-exchange message 405 (Block 700) and retrieves its contents (Block 705). This retrieval reverses the process of encapsulation performed by the edge router in Block 615, for example by reversing the processing that embedded the key-exchange message 404 in an encrypted TLS stream. Thus the information contained in the original key-exchange message 404 that was sent by the end node is available to the cryptographic node 306 for interpretation according to the key-exchange protocol.

The cryptographic node 306 interprets the now-extracted key-exchange message (Block 710) according to the key-exchange protocol in use (for example, IKE or KINK).

Block 715 tests to see if a protocol response is required for the protocol message that has been extracted in Block 705. In certain conditions, the key-exchange protocol may dictate that no response message be composed or transmitted; in preferred embodiments, the fundamental procedures of any key-exchange protocol with which the present invention is practiced are not modified, and therefore, the processing of FIGS. 6, 7, and 8 terminates when the test in Block 715 has a negative result. (Note, however, that this processing may later be reactivated, for example when a subsequent SA negotiation begins, in which case the process recommences with Block 600 of FIG. 6 and message 404 of FIG. 4.) If the SA negotiation process has terminated, the cryptographic node stores the negotiated SA into an SA repository. (The SA repository is described in more detail below.) To support the SA distribution procedure, the SA is associated with the network address of the end node that originated the key-exchange messages and, optionally, is also associated with the internal and/or external network address of the edge router that forwarded the most recent key-exchange message during the SA negotiation procedure.

If the key-exchange protocol dictates that a response message be composed or transmitted, then the test in Block 715 has a positive result and processing continues at Block 720. In Block 720, the cryptographic node composes a response according to the key-exchange protocol in use and the contents of the message 404. According to preferred embodiments, the key-exchange protocol processing is performed using the network addresses relevant to the message 404, rather than any network address of the cryptographic node 306. That is, the SA is established as being between the end node's IP address and the edge router's IP address, and does not reflect the cryptographic node's address, and therefore Block 720 composes the response such that it reflects this information. This is an important distinction because the result of a successful key-exchange negotiation is one or more Security Associations (SAs) that are relevant to a particular pair of network addresses (for example, two IP addresses). The present invention generates SAs that are relevant to an end node 301 and one or more edge routers 303, 304; thus key-exchange must proceed using the end node and edge router addresses, not the address of a cryptographic node 306.

At Block 725, the cryptographic node 306 encapsulates the key-exchange message composed in Block 720, producing an encapsulated key-exchange message 406. Note that in one embodiment (believed to be particularly advantageous because of its reduced processing time and memory requirements), the functionality described for Blocks 720 and 725 may be combined; that is, the message to be transmitted to the end node may be composed in an encapsulated state, requiring no further processing to be ready for transmission. For example, when the key-exchange message is to be encapsulated in a message of a connectivity protocol (in accordance with the third embodiment of the SA negotiation procedure described above), the entire connectivity protocol packet, including the key-exchange message, may be constructed within a single memory buffer; this eliminates the need to separately construct the key-exchange message and copy it into the connectivity protocol packet. In either case, whether the message is composed as encapsulated or is separately encapsulated, the process of encapsulation corresponds to the process of encapsulation performed at Block 615. (That is, the message specified by the key-exchange protocol may be encapsulated in a transport-layer or network-layer tunnel or link-layer tunnel, or its addressing information may be reversibly modified, or it may be encapsulated within a connectivity protocol to produce the encapsulated key-exchange message 406.)

At Block 730, the encapsulated key-exchange message 406 is transmitted by the cryptographic node 306 to an edge router 303, 304. In one embodiment, the message 406 may be transmitted directly to the edge router from which the original encapsulated key-exchange message 405 originated. In another embodiment, the message 406 may be transmitted to all edge routers, using a broadcast or multicast facility of the back-end network 305. In another embodiment, static or dynamic routing information (for example, information stored in a radix tree initialized at system boot time, or information maintained by a routing or connectivity protocol such as OSPF or RIP) is used to choose a particular edge router 303 to which to transmit the message 406. The routing information used in this latter embodiment preferably selects the edge router which can best exchange messages with the end node 301 across the front-end network 302. (Note that because the IKE payload of this message is encrypted by the cryptographic node before transmission, a receiving edge router does not have access to the sensitive data contained therein during this exchange.)

Figure 8:
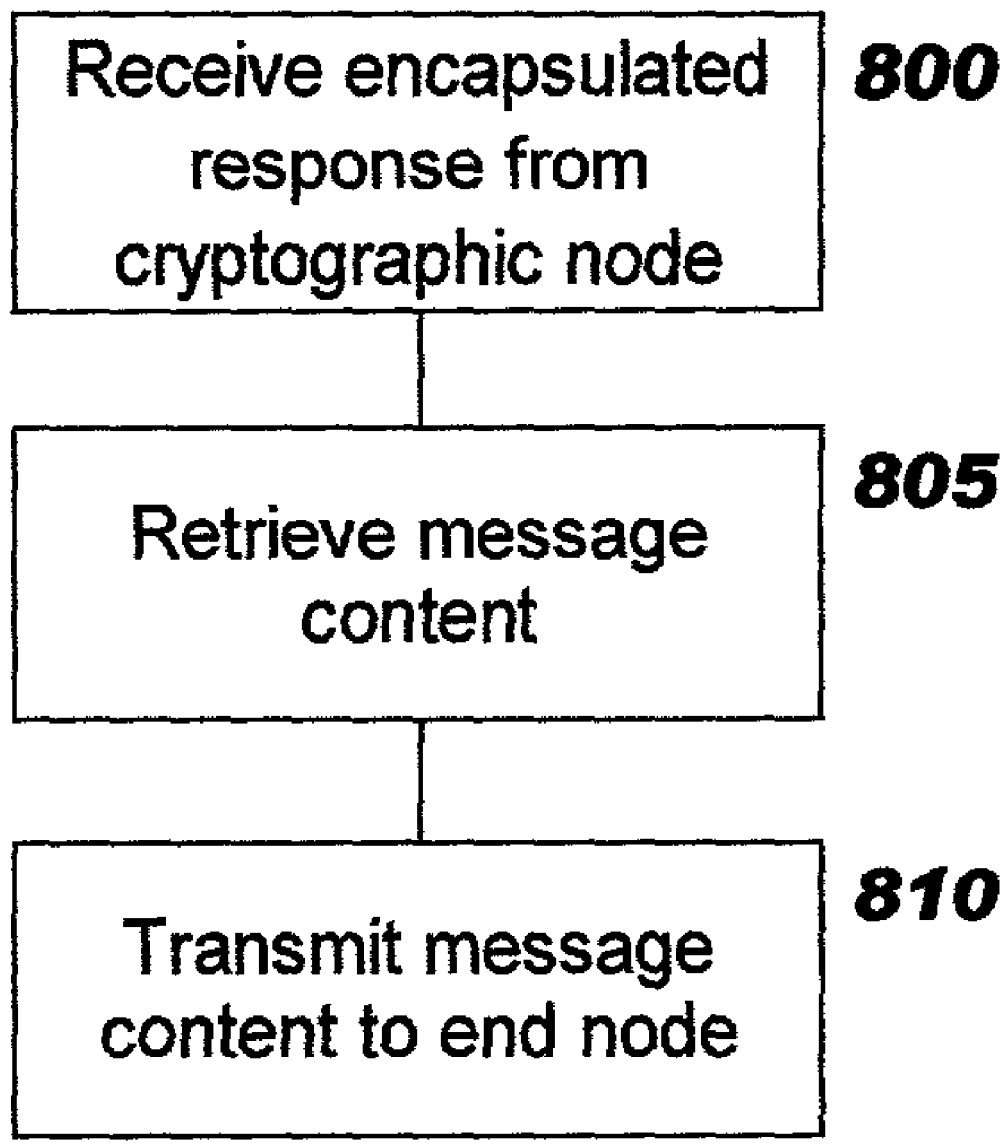

Referring now to FIG. 8, at Block 800, the edge router 303 receives the encapsulated key-exchange message 406 and reverses (Block 805) the process of encapsulation that was performed by the cryptographic node 306 at Block 725, thereby obtaining the content of the response message. (In the first embodiment, the packet arrives at the edge router over a specific encrypted tunnel, and thus the processing of Block 805 is analogous to processing other prior art tunneled packets. In the second embodiment, the packet is destined for the end node, and the edge router simply receives it by virtue of being the last hop (or, alternatively, the packet is explicitly destined for the edge router). In the third embodiment, Block 805 comprises extracting the message from the encapsulating connectivity protocol.)

The edge router 303 then transmits (Block 810) the now decapsulated key-exchange message 407 to the end node. (If the cryptographic node sent a response to a plurality of edge routers in Block 730, then all receiving routers may forward the response to the end node in Block 810. Or, each edge router might determine whether the end node is nearby, and only forward the response if the end node is within vicinity.)

Figure 6:
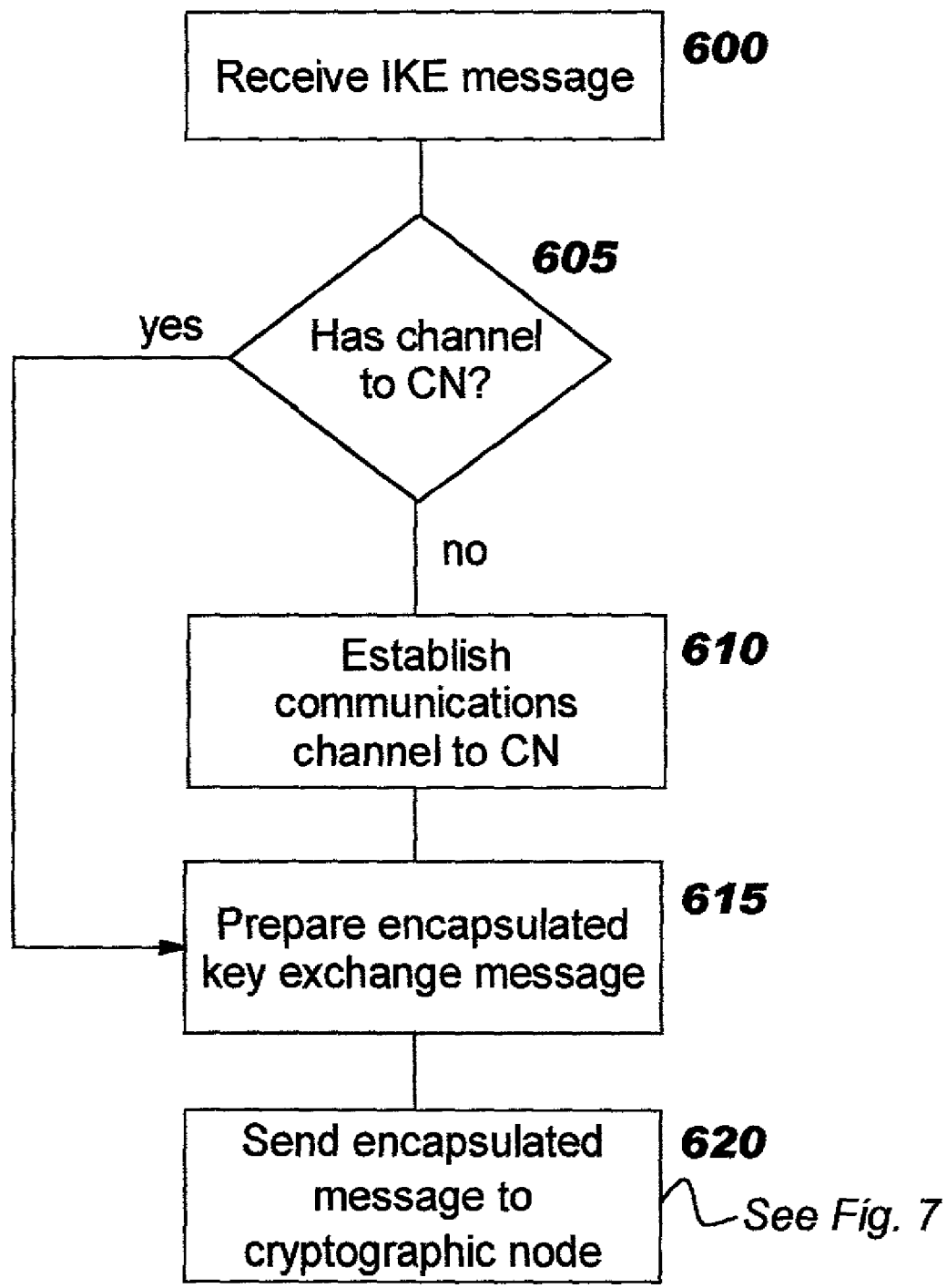
FIGS. 6–8 provide flowcharts illustrating logic underlying SA negotiation techniques of the present invention.

The operations illustrated in FIGS. 6, 7, and 8 may be repeated as many times as are required to establish Security Associations for IPsec processing 408, 409 (and 410, 411 if a response is required according to the key exchange protocol); in other words, these operations constitute a subprocess that is repeated until the underlying key-exchange protocol (for example, IKE or KINK) completes its process of negotiating SAs or aborts.

For certain key-exchange protocols (for example, the preliminary version of the KINK protocol) a two-message exchange suffices to establish SAs, and no repetitions of the operations of FIGS. 6, 7, and 8 are required; for other key-exchange protocols (for example, IKE), further messages may be or are always required.

The aforementioned process enables the negotiation of IPsec SAs between the end node and the cryptographic node (operating on behalf of the edge routers), according to the present invention, even though the end node may be mobile during this process. In preferred embodiments, the cryptographic node stores the negotiated SAs (e.g. the negotiated cipher, the key to be used, the identification of the endpoints, and so forth) into an SA repository, which may (for example) be a database or a file or an in-memory record. The SA repository is preferably co-located with the cryptographic node, though in alternate embodiments, the SA repository may be located in a separate server and accessed via a network protocol such as Network File System ("NFS") or Hypertext Transfer Protocol ("HTTP") or Open Database Connectivity ("ODBC"), any of which may be encapsulated in an encrypted tunnel such as SSL, TLS, or IPsec. It should be noted that within the SA repository, SAs may be updated with cryptographic information made available by the edge routers that are implementing the IPsec protocol. These updates may be made explicitly via a request from the edge router to the cryptographic node or SA repository, or they may be applied implicitly as a result of the SA distribution procedure.

These stored SAs need to be distributed to the edge routers, so that the edge routers can use them for communicating securely with end nodes. Two processes are disclosed herein for performing this SA distribution. (Variations of these two processes may be designed once the teachings disclosed herein are known, and such variations are also within the scope of the present invention.) One process performs the SA distribution in response to an explicit retrieval request, referred to herein as a "connectivity query" message. Another process pro-actively distributes SAs from the cryptographic node. Each of these processes will now be described.

In preferred embodiments of the present invention, an end node communicates via IPsec with one or more edge routers to exchange its data traffic, using one or more SAs which have been created according to the above-described techniques. If the edge router in contact with an end node already has the SA that was negotiated with this particular end node (for example, as a result of the SA distribution procedure described herein), then IPsec communications proceed as if the SA was established according to the prior art. However, if an end node begins to communicate via IPsec (e.g. using either ESP or AH) with an edge router that does not have access to the corresponding SA, the edge router retrieves the SA from the SA repository that, as mentioned above, is co-located with the cryptographic node in preferred embodiments. (For example, with reference to FIG. 1, suppose an SA between end node 100 and edge router 110 has not been distributed to edge router 130 when end node 100 moves into contact with that edge router 130. This may happen, for example, because the SA has not yet been distributed, or because edge router 130 has been activated after the SA was distributed by broadcast, or because the SA was selectively distributed only to edge router 110, or because cryptographic information previously distributed with the SA is now obsolete, etc.) This SA retrieval technique is now described.

Figure 4:
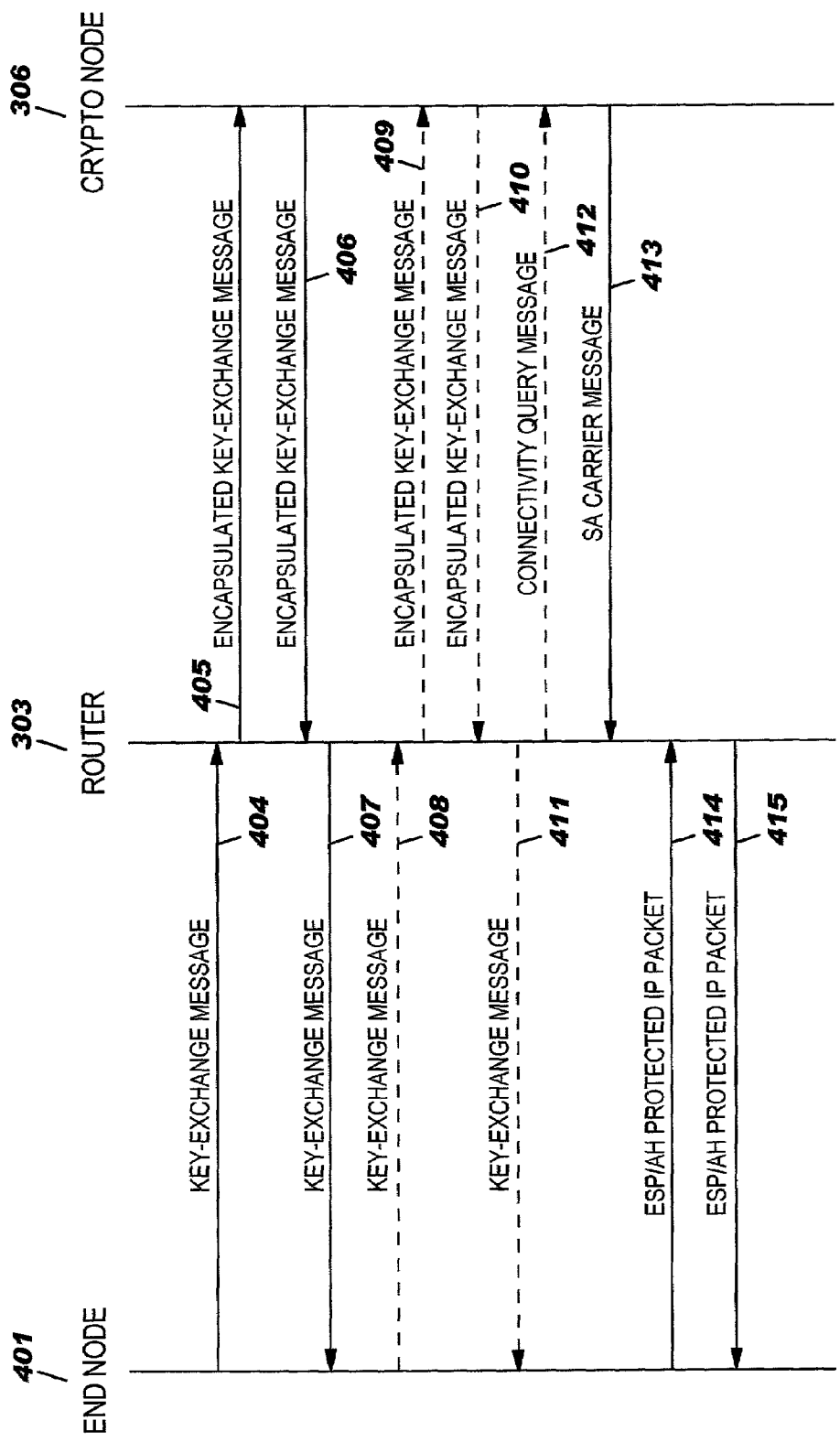
FIG. 4 is a diagram of the flow of messages between an end node, edge router, and a cryptographic node pursuant to the invention.
Figure 9:
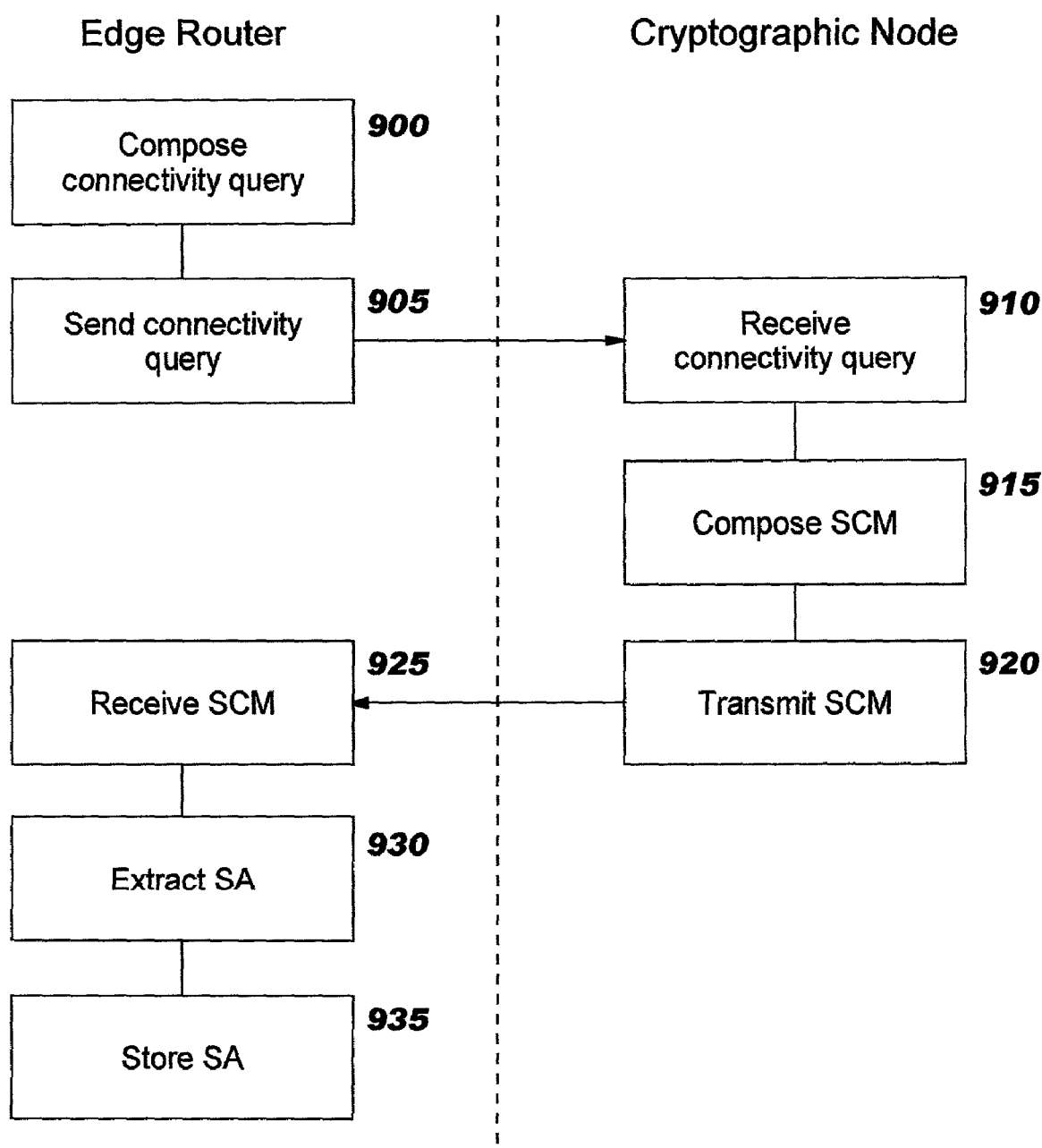
FIG. 9 provides a flowchart illustrating SA retrieval, according to embodiments of the present invention.

Referring now to the logic in FIG. 9 and the continuing message exchange in FIG. 4, one embodiment of the SA retrieval procedure begins at Block 900, where an edge router 304 composes and then transmits (Block 905) a connectivity query message 412 to the cryptographic node 306 over a secure session of the type which has been previously described. Examples of a connectivity query message include, but are not limited to: (1) an explicit SA retrieval request message delivered via a Remote Procedure Call ("RPC") interface; (2) a route announcement in a layer 3 routing protocol such as OSPF or RIP; (3) a "device arrival message" in certain other protocols such as the spanning-tree protocols used by link-layer (layer 2) network switches; or (4) a connectivity notification as described in Block 715 in the first related invention. This connectivity query message identifies the edge router 304 originating the request and the end node whose SA information is being requested. The connectivity query message requests transmission to the edge router 304 of the SA information present in the SA repository of cryptographic node 306 as the result of the SA negotiation procedure (as described previously) and the key-exchange protocol in use.

In response to receiving the connectivity query message in Block 910, in Block 915 the cryptographic node 306 composes a message referred to herein as a "Security Association Carrier Message" ("SA Carrier Message" or "SCM") 413. The SCM 413 is a network message (for example, a message of a connectivity protocol such as those just described with reference to Block 905) that contains the SA information that was negotiated by the key-exchange protocol (as retrieved by cryptographic node 306 from its SA repository) and that is required by the ESP and/or AH protocols.

In Block 920, the cryptographic node 306 transmits the SCM 413 to one or more edge routers 303, 304. In one embodiment, the cryptographic node 306 responds to the connectivity query message 412 by transmitting the SCM to the edge router 304 that transmitted that message. In another embodiment, the SCM 413 is transmitted to a plurality of edge routers 303, 304.

It should be noted that the connectivity query message and SCM respectively may be sent directly to or transmitted directly from the SA repository, in the case that the SA repository is coupled with a request processing function. For example, this might be the case when the SA repository is a database that can respond to ODBC queries.

In preferred embodiments, the second SA distribution process discussed above is used, whereby the SA distribution process is performed pro-actively to cause an edge router 303 or set of edge routers to be "pre-loaded" with the negotiated SA information. In this case, it is not necessary to await the triggering connectivity query message 412 before distributing the SAs to the edge router(s), and the processing of Blocks 900–910 can be omitted. In this embodiment, the SCM 413 created in Block 915 may be transmitted to distribute SA information proactively to a multicast, anycast, or unicast address. It is believed to be particularly advantageous to select an edge router 303 or set of edge routers to pre-load with the SA information by using the network address of the edge router from which the last encapsulated key-exchange message 405, 409 was received during the SA negotiation procedure.

The SCM is then received by the edge router (Block 925), and the SA information it contains is extracted (Block 930) and stored (Block 935) for use by this edge router.

Subsequent to the processing of Block 935, in both the connectivity query triggering and the pre-loading scenarios, the SAs needed for communication between the end node 301 and at least one edge router 304 are available, and IP traffic may be protected with the ESP and/or AH protocols using existing implementations of standardized ESP and AH.

Supplemental procedures which enable seamless connectivity when using protocols such as ESP and AH in a wireless environment, where an end node may communicate with more than one edge router during an ongoing secure message flow, will now be described with reference to FIGS. 10 and 11.

In one embodiment of the invention, believed to be particularly advantageous when the front-end network 302 is a wireless network, supplemental procedures may be used to propagate SA information between edge routers 303, 304 upon demand; this enables seamless roaming of the end node 301 between edge routers, while enabling ESP and AH implementations to continue to function without interruption. This embodiment is believed to be particularly advantageous in combination with Network Address Translation ("NAT") a routing architecture in which many edge routers 303, 304 may share a single IP address on the front-end network 302, each edge router 303, 304 serving end nodes in a particular physical location or region. This embodiment is also believed to be particularly advantageous in environments containing large numbers of active end nodes and/or edge routers.

Figure 10:
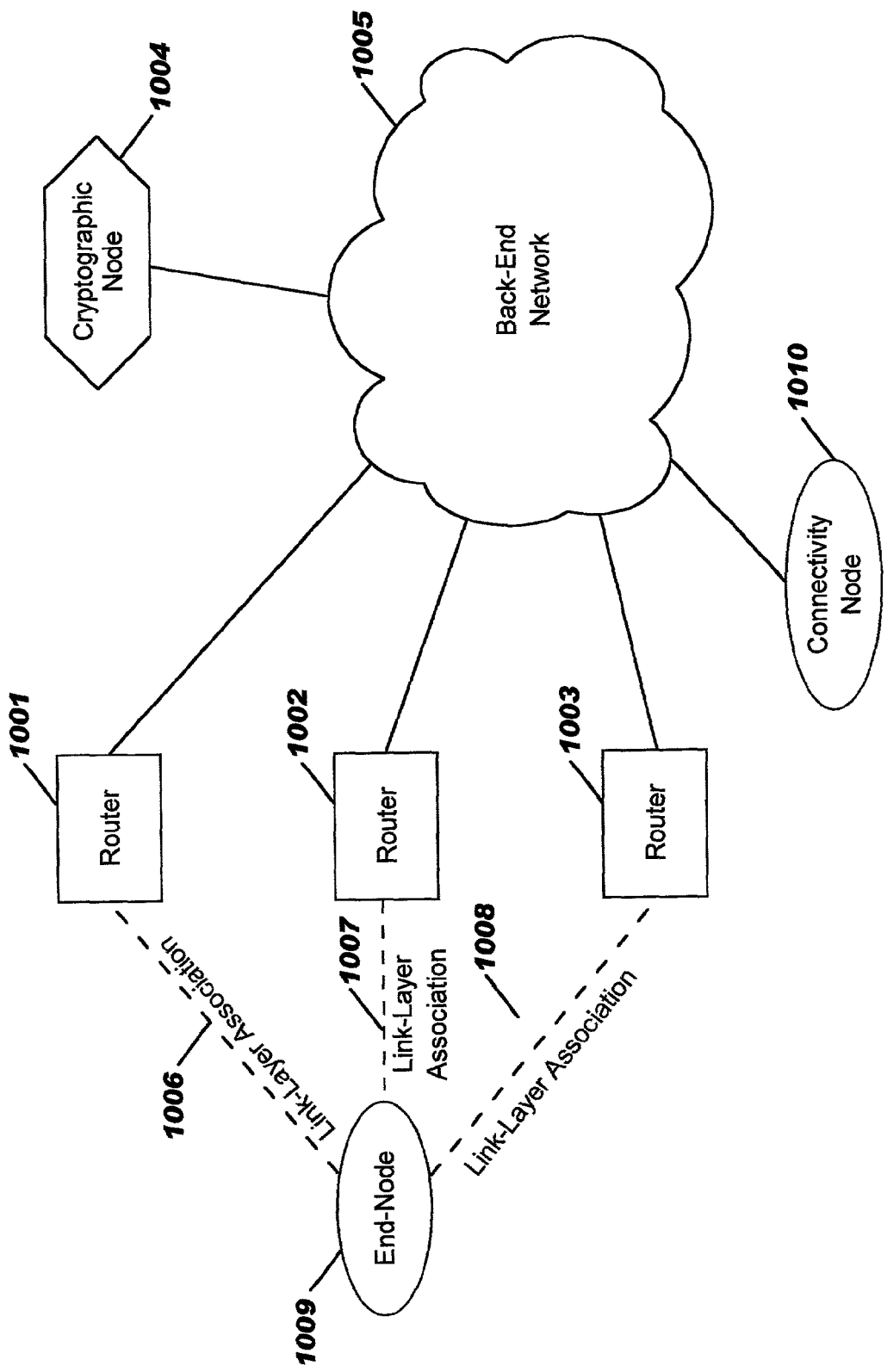
FIG. 10 is a diagram similar to FIG. 3, except that explicit link-layer associations have been shown between an end node and edge routers.
Figure 11:
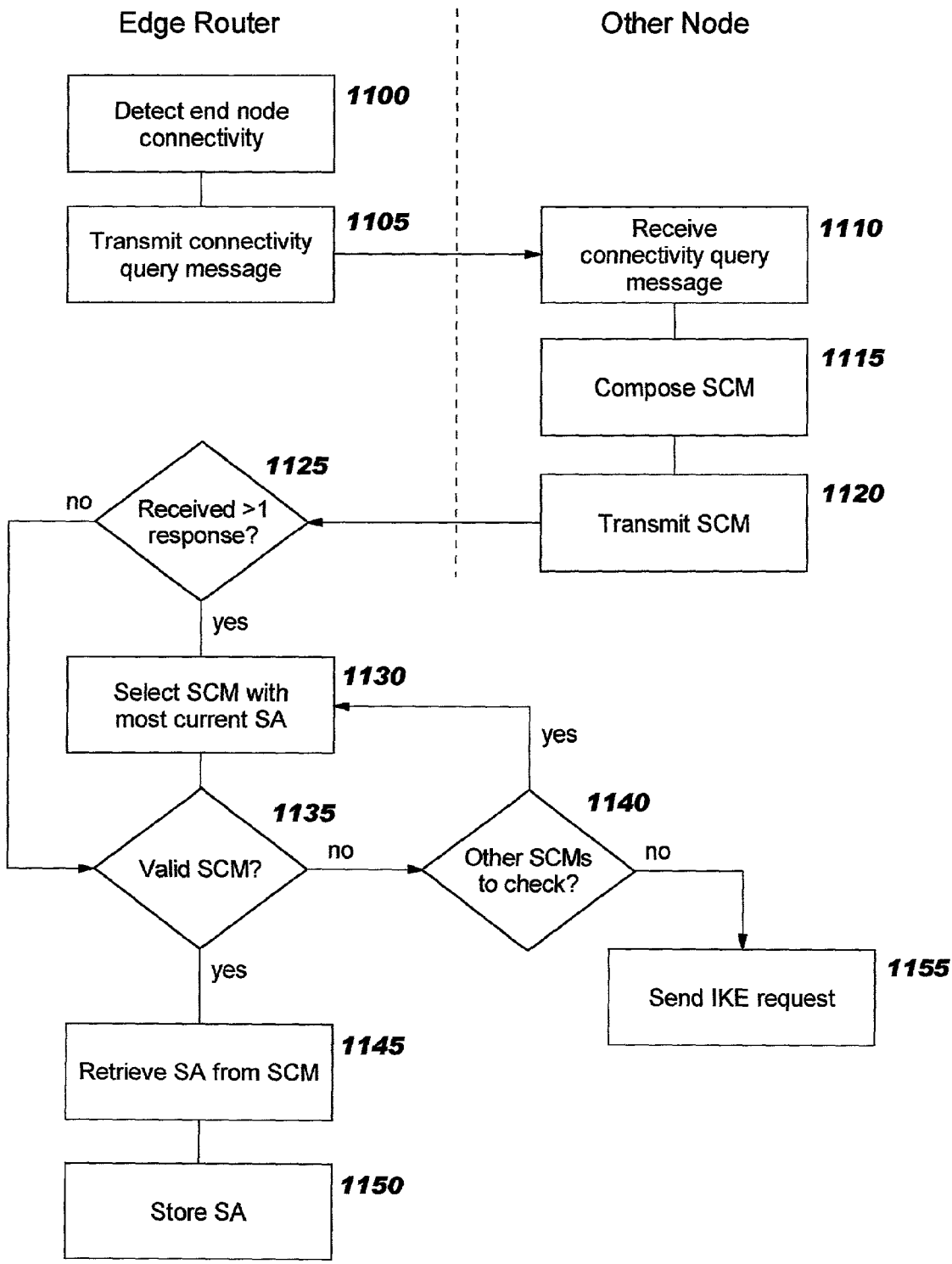
FIG. 11 provides a flowchart illustrating propagation of SAs between edge routers, according to embodiments of the present invention.

Referring now to FIGS. 10 and 11 of the drawings, the supplemental procedures are triggered when an end node 1009 forms a link-layer association 1006, 1008 (Block 1100) with an edge router 1001 (for example, by selecting an access point pursuant to the IEEE 802.11 or Bluetooth link-layer protocols, where that access point is on the same network segment as the edge router 1001). By performing the SA retrieval pro-actively in this manner, as soon as the edge router detects that the end node has made a link-layer connection, the SA should be available in advance of actually needing it for ESP or AH packet processing.

The edge router 1001 then transmits (Block 1105) a connectivity query message (see the discussion of connectivity query messages with reference to Block 905 of FIG. 9) across the back-end network 1005 to one or more nodes connected to that network. This message inquires whether this end node 1009 was participating in an ongoing message flow. In one embodiment, the message is a unicast message directed to a connectivity node 1010 (e.g., a Handoff Core Server according to the aforementioned first related invention) that is responsible for determining which node maintains the most current connectivity information (for example, message routing information, NAT connection state information, or IPsec SA information) for a given end node. In another embodiment, the message is a unicast or anycast message directed to an edge router 1002 that previously maintained a link-layer association 1107 with the end node 1009; the identity of this edge router may be ascertained by means of the connectivity protocol between the plurality of edge routers or by means of another Inter-Access Point Protocol (IAPP) supporting communication between various access points. In still another embodiment, the message is a unicast or anycast message sent to a cryptographic node 1004 that consults its SA repository. In yet another embodiment, the message is a broadcast or multicast message sent to multiple nodes (for example, a broadcast message sent to all nodes 1001, 1002, 1003, 1004, 1010 connected to the back-end network or a multicast message sent to all edge routers 1001, 1002, 1003 connected to the back-end network).

If any node in the set of nodes which receives (Block 1110) the connectivity query message has SA information relevant to the specified end node 1009, that node composes a SCM (Block 1115) and in preferred embodiments of this edge router-to-edge router propagation, transmits (Block 1120) the SCM over a secure connection to the edge router 1001 which sent the connectivity query message. In one embodiment, the SCM contains a timestamp identifying when the associated SA was last used; this timestamp allows the querying edge router 1001 to determine which response is most up-to-date, in the event that multiple SCMs are received. In another embodiment, the SCM does not contain a timestamp. Processing of this timestamp is discussed below with reference to Block 1125.

If no SCM response is received by the querying edge router 1001, a connectivity query message is optionally sent to an alternate node or set of nodes on the back-end network (not shown in FIG. 11). This optional process allows successive queries to be performed to different sets of nodes, for efficiency, performance, and protocol correctness reasons. (The protocol correctness issue is discussed in more detail below, with reference to Block 1155.) It is believed to be particularly advantageous for an edge router 1001 to query first the edge routers 1002, 1003 or connectivity node 1010 which are connected to the backend network, and then the cryptographic node 1004; the query of the cryptographic node corresponds to the afore-described SA retrieval procedure. (See the discussion of messages 412, 413 in FIG. 4, as well as Blocks 900–915 of FIG. 9.)

In Block 1125, if multiple SCMs were received, the edge router 1001 preferably selects the response in which the SAs are the most current (Block 1130). This selection is facilitated by the presence of timestamps in the SCM messages, as described above. If timestamps are not available, then any suitable heuristic may be used to select among a potential plurality of responses. Selecting the most current response is important to maintain correctness of the ESP and AH protocols because the most current cryptographic information contained in the SA may be required to correctly process new ESP or AH messages. Thus, in one embodiment, the most current SCM is selected by examining a timestamp in the SCM. In another embodiment, such as when no timestamp is present in one or more of the SCMs, the most current SCM is preferably selected by examining the sequence number of the ESP or AH protocol, as specified in the SA.

With a SCM selected, Block 1135 checks to see if this SCM is valid. If it is not, then Block 1140 checks to see if there are other SCMs available. If no SCMs are available, then control transfers to Block 1155. Otherwise, when there are other SCMs available, processing returns to Block 1130.

When the test in Block 1135 determines that the SCM is valid, the SAs are retrieved (Block 1145) from that SCM and stored locally (Block 1150), so that they may be used to communicate using ESP and/or AH with the end node; the supplemental procedures terminate.

If no SCM may be selected, because no valid SCM is received, the supplemental procedures also terminate; however, clearly there are no SAs available for communication using ESP and/or AH between the edge router 1001 and the end node 1009 in this case. If the end node 1009 correctly implements a supported key-exchange protocol (Block 1155), it will transmit a new key-exchange packet, triggering the key exchange processing (as described above with reference to FIGS. 4, 6, 7, and 8), which will eventually make SAs available for communication.

The supplemental procedures described herein are deemed to be particularly effective when combined with an SA repository update procedure. This procedure updates the SA information stored in the SA repository with current cryptographic information generated during the use of the SA by the edge router. By updating the SA repository, the edge router ensures the availability of the current SA should that edge router fail.

Figure 12:
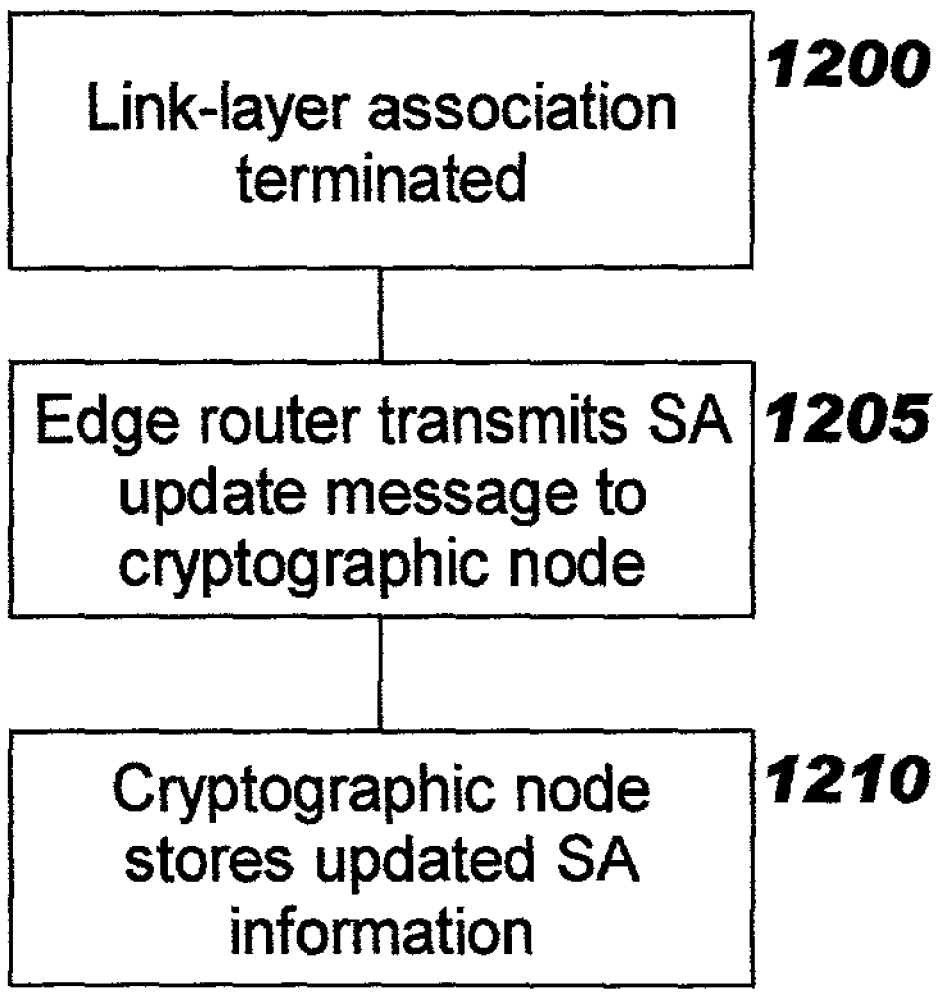
FIG. 12 provides a flowchart illustrating an SA repository update procedure that may be used advantageously with embodiments of the present invention.

The SA repository update procedure will now be described with reference to FIGS. 10 and 12 of the drawings. The procedure is triggered when an end node 1009 terminates a link-layer association 1006, 1008 (Block 1200) with an edge router 1001 (for example, by ceasing communications with an access point pursuant to the IEEE 802.11 or Bluetooth link-layer protocols, where that access point is on the same network segment as the edge router 1001). The edge router 1001 then transmits (Block 1025) an SA update message to the cryptographic node 1004 capable of communicating with the SA repository. The SA update message includes the current cryptographic information associated with the SA, along with other relevant information. In one embodiment, the message is a unicast or anycast message sent to a cryptographic node 1004. In another embodiment, the message is a unicast message directed to a connectivity node 1010 (e.g., a Handoff Core Server according to the aforementioned first related invention) that is responsible for determining which node maintains the most current connectivity information (for example, message routing information, NAT connection state information, or IPsec SA information) for a given end node. In yet another embodiment, the message is a broadcast or multicast message sent to multiple nodes connected to the back-end network.

At Block 1210, the cryptographic node stores the updated SA information within the SA repository. The SA update procedure then terminates.

Common to all the described embodiments of the invention, as well as to other embodiments which may be envisioned based on the teachings disclosed herein, is the feature that a single physical network node may serve multiple functional purposes pursuant to the invention. For example, a single physical node (for example, a rack-mounted microcomputer with sufficient Random Access Memory ("RAM") and processor resources and multiple network interfaces) may serve as a combination edge router 1003 and connectivity node 1010, or as a combination connectivity node 1010 and cryptographic node 1004. Similarly, it is believed to be advantageous to combine the functions of a cryptographic node 1004 and an edge router 1001, 1002, 1003 as a cost-effective means of deploying multiple cryptographic nodes. And, if desired, a single node may perform as an edge router, connectivity node, and cryptographic node.

In an embodiment where cryptographic node function and edge router function is combined, the back-end network 1005 is preferably an internetwork of a physical network (such as an Ethernet network) and a logical network (such as the "loopback" network interface provided by most TCP/IP implementations); in some embodiments, the internetwork may even employ multiple underlying network protocols (such as TCP/IP or UDP/IP and the "Unix domain sockets" provided by certain computer operating systems, or even a special-purpose shared-memory communication facility). Thus it may be seen that the invention may be practiced with radically different hardware, software, and network architectures, achieving the objects of enhancing the security of wired and wireless networks while maintaining scalability, reliability, and performance, and enabling scalable and reliable implementation of the IPsec protocol in distributed or clustered environments.

The embodiments described thus far perform ESP and AH protocol processing at an edge router using prior art techniques, once that edge router has an appropriate SA, which may be obtained using any of the several approaches described herein.

Figure 5:
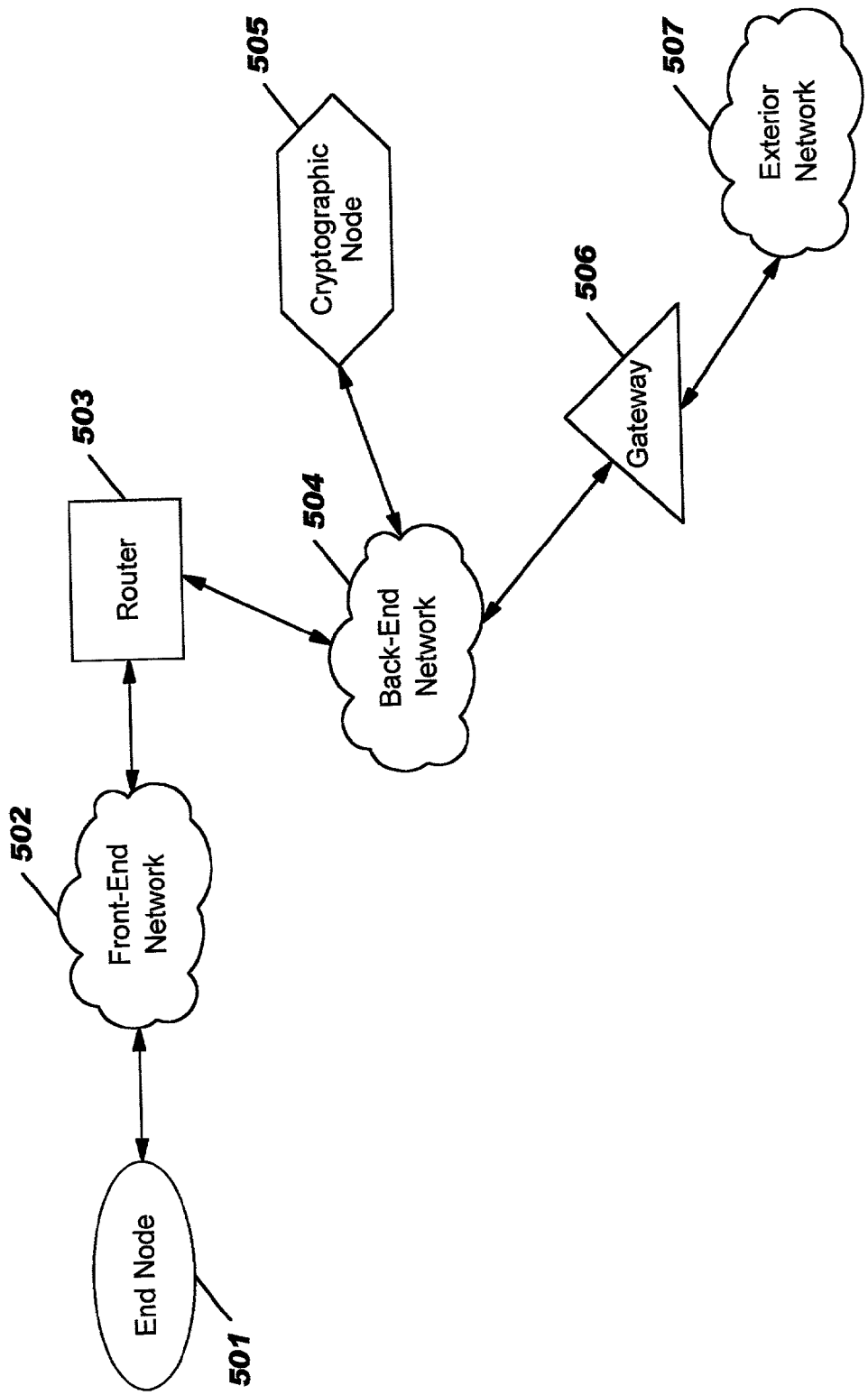
FIG. 5 is an overview diagram of a network including an embodiment of the invention and additional network components (a "gateway" and an "exterior network").

In alternate embodiments, the IPsec (AH and ESP protocol) processing may be performed at separate encryption nodes located in the back-end network or the external network (see elements 504 and 507 of FIG. 5, respectively). This may be appropriate, for example, when the edge routers do not have sufficient processing capacity to support data encryption operations. In the presence of encryption nodes, the IPsec traffic (which includes both the key-negotiation traffic, such as IKE or KINK, and the encrypted data, such as AH or ESP) sent from the end node is addressed to the network address of the encryption node. The edge router forwards IPsec traffic between the end node and the encryption node(s), in accordance with the destination IP address in the packet. In this situation, responsive to receiving a key-negotiation packet, the encryption node redirects the key-negotiation processing to the cryptographic node in accordance with the SA negotiation procedures described previously. Further, in this situation, responsive to receiving an AH or ESP packet from an end node for whom an SA is not available locally, the encryption node retrieves the SA from the SA repository at the cryptographic node, using the approach described above with reference to FIG. 9 and messages 412, 413 of FIG. 4. The encryption node then uses the retrieved SA to communicate with the end node via IPsec. If the edge router performs Network Address Translation (NAT), then the IPsec traffic must be encapsulated by the end node and by the encryption node in some other protocol, such as UDP. Such "UDP encapsulation" of IPsec is well known in the prior art. (See, for example, the Internet Draft entitled "IPsec ESP Encapsulation in UDP for NAT Traversal", originally published in March 2001.)

In such an environment, the edge routers may perform packet filtering operations (as described in the second related invention), effectively controlling which traffic may pass to and from end nodes, in accordance with various policies, as will be described further below.

In one configuration of these packet filters, end nodes must direct all traffic either to various network services (such as a Domain Name Server, or "DNS server") or to one of the encryption nodes. This configuration forces all application data to be encrypted via an IPsec tunnel terminating at one of the encryption nodes.

In another configuration of these packet filters, end nodes may direct traffic to various network services (such as a DNS server) or to one of the encryption nodes or to a selection of server hosts or networks. With this configuration, application traffic may proceed directly to its destination host (as long as the destination host is among the aforementioned selection of server hosts or networks permitted by the packet filters), while all remaining application traffic must be encrypted via an IPsec tunnel terminating at one of the aforementioned encryption nodes with which traffic is permitted by the packet filters. This configuration may be particularly advantageous when certain traffic (such as Internet traffic) does not merit IPsec encryption because it will be traveling over another insecure network en route to its destination, while other traffic (such as intranet traffic) should be made secure by means of an IPsec tunnel. In a network environment, this configuration reduces the load on the encryption nodes by allowing some traffic to bypass processing by those nodes.

In yet another configuration of these packet filters, end nodes may direct traffic to various network services (such as a DNS server) or to a selection of server hosts or networks, but not to one of the encryption nodes. This configuration forces all network traffic to proceed directly to its destination host, as long as that destination host is included in the aforementioned selection of server hosts or networks accepted by the packet filter. This configuration may be particularly advantageous when supporting users who should not have access to locally provided encryption services at the encryption nodes. It therefore reduces the load on the local encryption nodes.

It should be noted that different packet filters may be applied according to factors such as the identity or class of the user sending traffic from a particular end node. For example, guest users within the network environment may receive packet filtering in accordance with the third sample configuration above, while employees of the organization may receive packet filtering in accordance with the second sample configuration above.

In this way, the packet filters effectively enable unencrypted traffic to pass, reducing the overall burden on the encryption nodes.

With respect to this embodiment, it should be noted that the edge routers and encryption nodes need not be equal in number. It is also to be noted that a cryptographic node and an encryption node may be physically co-located and integrated. In one simple configuration, a single IPsec node (comprising the encryption node and cryptographic node functions) may support a plurality of edge routers. In this configuration, the IPsec node functions in an analogous manner as a traditional IPsec implementation.

The present invention has been described with respect to several variations of possible embodiments which are illustrative, and are not meant to and should not be construed to limit the invention. Those skilled in the art will understand that variations from the embodiments and conditions described herein may be made without departing from the invention as claimed in the appended claims.

In particular, while preferred embodiments have been described with reference to the IPSec protocol, the teachings disclosed herein may be applied advantageously to other protocols having similar characteristics. For example, other link-layer encryption algorithms (such as PPTP, L2TP, and L2F) have similar key-negotiation, security association, and packet flow structures as IPsec, and the descriptions provided herein may therefore be adapted for use with such algorithms in a straightforward manner.

Furthermore, although preferred embodiments of the present invention have been described herein with reference to operation in wireless networks, this is merely one environment in which the disclosed techniques may be used advantageously. Use of the disclosed techniques in other environments and/or for other purposes is within the scope of the present invention. For example, independent of the wireless environment, the SA distribution process is also useful in environments having clustered servers, such as clusters of VPN servers. (Clusters of VPN servers may be provided, for example, to increase network scalability and/or fault tolerance.) For scalability, it is desirable for a "sprayer" or router to distribute or balance load among the multiple servers of the cluster, allowing an end node (i.e. client) to communicate with any node in the cluster. For fault tolerance, it is desirable to allow an end node to be transferred seamlessly from one server to another during a hot-swap operation which may be performed responsive to an outage. (Hot-swap operations are also referred to as "fail-over" operations, in that one device takes over for another device.) The techniques disclosed herein enable the end node to carry on secure communications in the presence of such movement of its secure session among servers.

The present invention has been described herein with reference to flowchart illustrations of methods, apparatus (systems), and computer program products embodied on one or more computer readable media. As will be obvious to one of ordinary skill in the art, these flowcharts are merely illustrative of the manner in which preferred embodiments of the present invention may be implemented, and changes may be made to the logic that is illustrated therein (for example, by altering the order of operations shown in some cases, by combining operations, etc.) without deviating from the inventive concepts disclosed herein.

What is claimed is:

1. A method of enhancing security in a computing network, the computing network comprising a plurality of routing nodes, a cryptographic node, and an end node, the method comprising steps of:
   negotiating a set of security parameters between the end node and the cryptographic node; and
   securely distributing the set of security parameters to one or more of the routing nodes.

2. The method according to claim 1, wherein the negotiating step further comprises steps of:
   establishing a first communication path between the cryptographic node and a first of the routing nodes; and
   performing a key exchange between the end node and the cryptographic node over the first communication path, wherein a result of the key exchange is the set of security parameters.

3. The method according to claim 2, wherein the first routing node routes traffic for the end node.

4. The method according to claim 2, wherein the establishing step occurs responsive to receiving, at the first routing node, an initial key exchange message from the end node.

5. The method according to claim 4, wherein the initial key exchange message is an Internet Key Exchange ("IKE") message and the performed key exchange uses IKE messages.

6. The method according to claim 4, wherein the initial key exchange message is a Kerberized Internet Negotiation of Keys ("KINK") message and the performed key exchange uses this initial KINK message.

7. The method according to claim 2, further comprising the step of establishing a second communication path between the cryptographic node and a second routing node; and wherein the performing step uses the first communication path for a portion of the key exchange and uses the second communication path to complete the key exchange.

8. The method according to claim 7, wherein the first routing node and the second routing node share a network address.

9. The method according to claim 2, further comprising the step of establishing a plurality of communication paths to the cryptographic node, each of the communication paths originating from a different routing node; and wherein the performing step uses the first communication path for a portion of the key exchange and uses multiple ones of the plurality of communication paths to complete the key exchange.

10. The method according to claim 9, wherein the first routing node and the different routing nodes share a network address.

11. The method according to claim 2, wherein the communication path is a transport-layer tunnel.

12. The method according to claim 11, wherein the transport-layer tunnel is established using Secure Sockets Layer ("SSL").

13. The method according to claim 11, wherein the transport-layer tunnel is established using Transport Layer Security ("TLS").

14. The method according to claim 11, wherein the transport-layer tunnel is established using Secure Shell ("SSH" or "SECSH").

15. The method according to claim 11, wherein the securely distributing step further comprises sending at least one set of security parameters from the cryptographic node to at least one routing node using the transport-layer tunnel.

16. The method according to claim 2, wherein the communication path is a network-layer tunnel.

17. The method according to claim 16, wherein the network-layer tunnel is established using Internet Protocol Security ("IPsec").

18. The method according to claim 16, wherein the securely distributing step further comprises sending at least one set of security parameters from the cryptographic node to at least one routing node using the network-layer tunnel.

19. The method according to claim 2, wherein the communication path is a link-layer tunnel.

20. The method according to claim 19, wherein the link-layer tunnel is established using Point-to-Point Tunneling Protocol ("PPTP").

21. The method according to claim 19, wherein the link-layer tunnel is established using Layer 2 Tunneling Protocol ("L2TP").

22. The method according to claim 19, wherein the link-layer tunnel is established using Layer 2 Forwarding Protocol ("L2F").

23. The method according to claim 19, wherein the securely distributing step further comprises sending at least one set of security parameters from the cryptographic node to at least one routing node using the link-layer tunnel.

24. The method according to claim 2, wherein the communication path is established using Network Address Translation ("NAT").

25. The method according to claim 24, wherein the NAT substitutes a destination address of the cryptographic node for a destination address of the first routing node in order to forward messages received from the end node to the cryptographic node during the performing step.

26. The method according to claim 25, wherein the NAT further substitutes a source address of the first routing node for a source address of the end node in order to forward messages received from the end node to the cryptographic node during the performing step, and substitutes a destination address of the end node for a destination address of the first routing node in order to forward messages received from the cryptographic node to the end node to during the performing step.

27. The method according to claim 24, wherein the securely distributing step further comprises sending at least one set of security parameters from the cryptographic node to at least one routing node using a transport-layer tunnel or a network-layer tunnel or a link-layer tunnel.

28. The method according to claim 24, wherein the securely distributing step further comprises sending at least one set of security parameters from the cryptographic node to at least one routing node using a connectivity protocol.

29. The method according to claim 2, wherein the communication path is established using a connectivity protocol.

30. The method according to claim 29, wherein the connectivity protocol is Routing Information Protocol ("RIP").

31. The method according to claim 29, wherein the connectivity protocol is Open Shortest Path First ("OSPF").

32. The method according to claim 29, wherein the connectivity protocol is a Handoff Management Protocol ("HMP").

33. The method according to claim 29, wherein messages of the key exchange are encapsulated using the connectivity protocol.

34. The method according to claim 29, wherein the securely distributing step further comprises sending at least one set of security parameters from the cryptographic node to at least one routing node using the connectivity protocol.

35. The method according to claim 1, wherein the securely distributing step occurs upon request.

36. The method according to claim 35, wherein the request is multicast to a plurality of routing nodes and cryptographic nodes.

37. The method according to claim 36, wherein multiple responses to the multicast request are received, and further comprising the step of processing the multiple responses to select a most up-to-date set of security parameters.

38. The method according to claim 1 wherein the securely distributing step occurs responsive to arrival of encrypted data from the end node at a selected one of the one or more routing nodes.

39. The method according to claim 1 wherein the securely distributing step occurs responsive to establishment of a link-layer association between the end node and a selected one of the one or more routing nodes.

40. The method according to claim 1, wherein the securely distributing step occurs pro-actively.

41. The method according to claim 40, wherein the securely distributing step occurs responsive to the step of negotiating the set of security parameters.

42. The method according to claim 40, wherein the securely distributing step occurs responsive to establishment of a link-layer association between the end node and a selected one of the one or more routing nodes.

43. The method according to claim 1, wherein the securely distributing step further comprises the step of sending at least one set of security parameters from the cryptographic node to at least one routing node.

44. The method according to claim 1, wherein the securely distributing step further comprises distributing at least one set of security parameters from a selected one of the one or more routing nodes to at least one other routing node.

45. The method according to claim 44, wherein the securely distributing step enables the end node to remain securely connected as it moves through the network.

46. The method according to claim 1, wherein functionality of at least one of the routing nodes and the cryptographic node are co-located.

47. The method according to claim 1, wherein the securely distributed set of security parameters is used to securely transmit data between the end node and the one or more routing nodes.

48. The method according to claim 1, wherein the security parameters are Internet Protocol Security ("IPsec") security parameters.

49. The method according to claim 1, wherein the negotiation occurs according to Internet Protocol Security ("IPsec").

50. The method according to claim 1, wherein:
at least one of the routing nodes has a packet filter;
the packet filter determines selected traffic received from the end node at the at least one routing node for routing to an encryption node; and
the encryption node performs cryptographic operations on the selected traffic before transmitting the selected traffic to its final destination.

51. The method according to claim 50, wherein functionality of at least one of the encryption nodes and the cryptographic node are co-located.

52. The method according to claim 1, further comprising the step of storing, by the cryptographic node, at least one set of security parameters in a repository, and wherein the securely distributing step distributes selected ones of the stored sets.

53. The method according to claim 52, further comprising the step of updating at least one set of the security parameters stored in the repository.

54. The method according to claim 2, wherein the securely distributing step further comprises the step of sending at least one set of security parameters from the cryptographic node to at least one routing node.

55. The method according to claim 54, where the sending step uses the first communication path to send traffic to the first routing node.

56. The method according to claim 55, wherein the securely distributing step enables the end node to remain securely connected as it moves from the first routing node to the at least one routing node.

57. A method for enhancing security in a computing network, the computing network comprising a plurality of routing nodes, a plurality of encryption nodes, a cryptographic node, and an end node, wherein at least one of the routing nodes has a packet filter, the method comprising steps of:
negotiating a set of security parameters between the end node and the cryptographic node;
securely distributing the set of security parameters to one or more of the encryption nodes;
routing, to an encryption node, selected traffic received from the end node at the at least one routing node in accordance with the packet filter; and
performing cryptographic operations on the selected traffic at the encryption node before transmitting the selected traffic to its final destination.

58. The method according to claim 57, wherein functionality of at least one of the encryption nodes and the cryptographic node are co-located.

59. The method according to claim 57, wherein said routing step further comprises routing, to a node that is not an encryption node, selected traffic received from the end node at the at least one routing node in accordance with the packet filter.

60. A system for enhancing security in a computing network, the computing network comprising a plurality of routing nodes, a cryptographic node, and an end node, the system comprising:
means for negotiating a set of security parameters between the end node and the cryptographic node; and
means for securely distributing the set of security parameters to one or more of the routing nodes.

61. The system according to claim 60, wherein the means for negotiating step further comprises:
means for establishing a first communication path between the cryptographic node and a first of the routing nodes; and
means for performing a key exchange between the end node and the cryptographic node over the first communication path, wherein a result of the key exchange is the set of security parameters.

62. A system for enhancing security in a computing network, the computing network comprising a plurality of routing nodes, a plurality of encryption nodes, a cryptographic node, and an end node, wherein at least one of the routing nodes has a packet filter, the system comprising:
means for negotiating a set of security parameters between the end node and the cryptographic node;
means for securely distributing the set of security parameters to one or more of the encryption nodes;
means for routing, to an encryption node, selected traffic received from the end node at the at least one routing node in accordance with the packet filter; and
means for performing cryptographic operations on the selected traffic at the encryption node before transmitting the selected traffic to its final destination.

63. A computer program product for enhancing security in a computing network, the computing network comprising a plurality of routing nodes, a cryptographic node, and an end node, the computer program product embodied on one or more computer-readable media and comprising:
computer-readable program code means for negotiating a set of security parameters between the end node and the cryptographic node; and
computer-readable program code means for securely distributing the set of security parameters to one or more of the routing nodes.

64. The computer program product according to claim 63, wherein the computer-readable program code means for negotiating further comprises:
computer-readable program code means for establishing a first communication path between the cryptographic node and a first of the routing nodes; and
computer-readable program code means for performing a key exchange between the end node and the cryptographic node over the first communication path, wherein a result of the key exchange is the set of security parameters.

65. A method of enhancing security in a clustered server computing environment, the computing environment comprising a cluster of server nodes, a cryptographic node, and at least one end node, the method comprising steps of:
negotiating a set of security parameters between the at least one end node and the cryptographic node; and
securely distributing the set of security parameters to one or more of the server nodes.

66. The method according to claim 65, wherein the securely distributing step further comprises distributing at least one set of security parameters from a selected one of the server nodes to at least one other server node.

67. The method according to claim 65, wherein the securely distributing step enables the at least one end node to remain securely connected during load balancing operations of the computing environment.

68. The method according to claim 65, wherein the securely distributing step enables the at least one end node to remain securely connected during fail-over operations of the computing environment.

* * * * *